US009596458B2

(12) United States Patent
Smith et al.

(10) Patent No.: US 9,596,458 B2
(45) Date of Patent: Mar. 14, 2017

(54) SWITCHABLE IMAGING DEVICE, SWITCHABLE OPTICAL DEVICE, AND DISPLAY

(75) Inventors: Nathan James Smith, Oxford (GB); Alexander Zawadzki, Oxford (GB); Benjamin John Broughton, Oxford (GB); Alexandra Baum, Upplands Vasby (SE)

(73) Assignee: Sharp Kabushiki Kaisha, Osaka (JP)

( * ) Notice: Subject to any disclaimer, the term of this patent is extended or adjusted under 35 U.S.C. 154(b) by 658 days.

(21) Appl. No.: 14/002,883

(22) PCT Filed: Mar. 6, 2012

(86) PCT No.: PCT/JP2012/056220
§ 371 (c)(1), (2), (4) Date: Sep. 3, 2013

(87) PCT Pub. No.: WO2012/121406
PCT Pub. Date: Sep. 13, 2012

(65) Prior Publication Data

US 2013/0342664 A1 Dec. 26, 2013

(30) Foreign Application Priority Data

Mar. 7, 2011 (GB) .................................. 1103815.5

(51) Int. Cl.
*H04N 13/04* (2006.01)
*G02B 27/22* (2006.01)
(Continued)

(52) U.S. Cl.
CPC ..... *H04N 13/0402* (2013.01); *G02B 27/2214* (2013.01); *G02B 27/26* (2013.01); *G02B 3/0087* (2013.01)

(58) Field of Classification Search
CPC .................................................. G02B 3/0087
See application file for complete search history.

(56) References Cited

U.S. PATENT DOCUMENTS 5,434,690 A 7/1995 Hisatake et al.
5,493,427 A 2/1996 Nomura et al.
(Continued)

FOREIGN PATENT DOCUMENTS

CN 101782695 A 7/2010
GB 2 455 614 A 6/2009
(Continued)

OTHER PUBLICATIONS

International Search Report for corresponding International Application No. PCT/JP2012/056220 mailed Apr. 17, 2012.
Form PCT/ISA/237 for corresponding International Application No. PCT/JP2012/056220 dated Apr. 17, 2012.
Yamamoto et al., "Optimum Parameters and Viewing Areas of Stereoscopic Full-Color LED Display Using Parallax Barrier", IEICE Trans Electron, vol. E83-c, No. 10, Oct. 2000.
(Continued)

*Primary Examiner* — Dave Czekaj
*Assistant Examiner* — Berteau Joisil
(74) *Attorney, Agent, or Firm* — Renner, Otto, Boisselle & Sklar, LLP

(57) ABSTRACT

A switchable imaging device (1) has a first mode of operation in which the device performs an imaging function and a second mode of operation different from the first mode, for example a non-imaging mode. In the first mode of operation the device comprises at least one first region that performs a lensing action and at least one second region that at least partially absorbs light passing through the or each second region. The switchable imaging device (1) may be disposed in path of light through an image display panel (4). This provides a display that may be operable in either a directional display mode such as an autostereoscopic 3D display mode or a 2-D display mode, by controlling the switchable imaging device to be in its first mode or its second mode.

18 Claims, 39 Drawing Sheets

(51) Int. Cl.
*G02B 27/26* (2006.01)
*G02B 3/00* (2006.01)

(56) References Cited

U.S. PATENT DOCUMENTS

| | | | | |
|---|---|---|---|---|
| 6,069,650 | A | 5/2000 | Battersby | |
| 7,375,784 | B2 | 5/2008 | Smith et al. | |
| 7,813,042 | B2 | 10/2010 | Mather et al. | |
| 2005/0105191 | A1* | 5/2005 | Baer .................... | G02B 3/0087 359/652 |
| 2006/0256259 | A1 | 11/2006 | Takagi et al. | |
| 2007/0035829 | A1* | 2/2007 | Woodgate ............ | G02B 3/0037 359/462 |
| 2007/0183015 | A1* | 8/2007 | Jacobs .................. | G02F 1/1323 359/245 |
| 2007/0296911 | A1 | 12/2007 | Hong | |
| 2008/0266387 | A1 | 10/2008 | Krijn et al. | |
| 2009/0102990 | A1* | 4/2009 | Walton .................. | G02F 1/1323 349/15 |
| 2009/0244682 | A1 | 10/2009 | Saishu et al. | |
| 2010/0026920 | A1 | 2/2010 | Kim et al. | |
| 2010/0182291 | A1 | 7/2010 | Kim et al. | |
| 2011/0032438 | A1 | 2/2011 | Yun et al. | |
| 2011/0234605 | A1* | 9/2011 | Smith ................ | G02B 27/2214 345/522 |
| 2013/0258219 | A1 | 10/2013 | Takagi et al. | |

FOREIGN PATENT DOCUMENTS

| | | | |
|---|---|---|---|
| JP | 07-077748 | | 3/1995 |
| JP | 07-234414 | A | 9/1995 |
| JP | 2006-276466 | | 10/2006 |
| WO | WO 2005/101855 | A1 | 10/2005 |
| WO | WO 2012/073324 | A1 | 6/2012 |

OTHER PUBLICATIONS

Commander et al., "Microlenses Immersed in Nematic Liquid Crystal With Electrically Controllable Focal Length", EOS Topical Digest Meetings, Microlens Arrays, vol. 5, pp. 72-76, 1995.

Takagi et al., "Autosterescopic Partial 2-D/3-D Switchable Display Using Liquid-Crystal Gradient Index Lens", SID 10 Digest, pp. 436-439, 2010.

* cited by examiner (Prior Art)

(Prior Art)

Plan view (Prior Art)

(Prior Art)

SWITCHABLE IMAGING DEVICE, SWITCHABLE OPTICAL DEVICE, AND DISPLAY

TECHNICAL FIELD

This invention relates to switchable imaging optics for use in autostereoscopic (no glasses) 3D displays and other multi-view displays.

BACKGROUND ART

For many years people have been trying to create better autostereoscopic 3D displays, and this invention provides a further advance in this field. An autostereoscopic display is a display that gives stereoscopic depth without the user needing to wear glasses. This is accomplished by projecting a different image to each eye. An autostereoscopic 3D display (hereafter 3D display) can be realised by using parallax optic technology such as a parallax barrier or lenticular lenses.

The design and operation of parallax barrier technology for viewing 3D images is well described in a paper from the University of Tokushima Japan ("Optimum parameters and viewing areas of stereoscopic full colour LED display using parallax barrier", Hirotsugu Yamamoto et al., IEICE trans electron, vol E83-c no 10 Oct. 2000).

FIGS. 1*a* and 1*b* shows the basic design and operation of parallax barrier technology for use in conjunction with an image display for creating a 3D display. The images for the left eye and right eye are interlaced on alternate columns of pixels of the image display. The slits in the parallax barrier allow the viewer to see only left image pixels from the position of their left eye and right image pixels from the position of their the right eye.

The same autostereoscopic 3D effect as shown in FIGS. 1*a* and 1*b* can be achieved by using lenticular lenses. Each lens is substantially equivalent to a parallax barrier slit. FIGS. 2*a* and 2*b* shows a conventional 3D system comprised of lenticular lenses and an image display.

The lenses image the appropriate pixels of the image display to the viewer's eyes. As shown in FIGS. 2*a* and 2*b*, light from the left image pixels is directed into the observer's left eye, and vice versa. The focal lengths of the lenses are typically designed to be approximately equal to the lens-pixel separation distance (i.e. the focal length of the lens is approximately at the plane of the pixels).

The lenticular lenses may also have a light blocking material positioned between the lenses, as described by U.S. Pat. No. 7,813,042B2. The light blocking material reduces light leakage from between the lenses and consequently improves the quality of the 3D image.

The technologies illustrated in FIGS. 1*a* and 1*b* and FIGS. 2*a* and 2*b* can be configured to provide a high quality 3D mode. However, many applications exist whereby a display is also required to operate in a high quality 2D mode. Using the technologies illustrated in FIGS. 1*a* to 2*b* would yield a 2D image with half the native resolution of the image display—this is highly undesirable. For the image display to show an image with 100% native resolution in the 2D mode, the parallax optics (parallax barrier or lenticular) must be switchable between a first mode that provides substantially no imaging function (2D mode) to a second mode of operation that provides an imaging function (3D mode).

An example of a switchable parallax barrier technology is disclosed in U.S. Pat. No. 7,813,042B2. However, switchable parallax barrier technology has the disadvantage that the parallax barrier absorbs light in the 3D mode, reducing transmission by ~65%. This inefficient light usage is a major disadvantage since the 2D mode and 3D mode will have a significantly different brightness. Boosting the brightness of the 3D mode can be achieved at the expensive of increased power consumption, which is highly undesirable, especially for mobile products.

An example of a switchable lens technology, based upon a physical lens in contact with liquid crystal, is disclosed in the paper by Commander et al (EOS Topical Digest Meetings, Microlens Arrays, vol. 5 (1995), pp 72-76).

U.S. Pat. No. 6,069,650 discloses an image display used in conjunction with a switchable lens (physical lenses in contact with liquid crystal) to create a display system that is switchable between a 3D mode and a 2D mode. The advantage of this switchable lens system is that the 3D mode is approximately the same brightness as the 2D mode. A first disadvantage of this technology is that the switchable lenses are more complicated and expensive to manufacture than a switchable parallax barrier. A second disadvantage of this technology is the degradation of the 2D mode image quality. This image degradation occurs because the refractive index of the liquid crystal varies as function of temperature and wavelength in a manner that does not exactly match that of the lens material. Consequently, a residual lensing effect occurs that causes an observable brightness non-uniformity.

WO05101855A1 describes the use of electro-wetting lenses that can be used in conjunction with an image display to realise a 3D display that can be switched between a 2D mode and a 3D mode. The disadvantage of this system is that the manufacture of electro-wetting lenses is complicated and expensive.

A liquid crystal lens (LC lens) is a switchable lens that uses conventional liquid crystal display (LCD) manufacturing processes. 3D display systems that use LC lenses have been disclosed by US2007/0296911A1, U.S. Pat. No. 7,375,784 and "30.3 Autostereoscopic Partial 2-D/3-D Switchable Display" by Takagi et al (SID DIGEST 2010 pp 436). The LC lens technologies described above have the disadvantage that the 3D mode is not high quality because the metric of 3D crosstalk for LC lenses is inferior to that of switchable parallax barrier technologies.

An electrode structure to enable a first 3D mode via a LC GRIN lens in a first orientation and second 3D mode via a LCD GRIN lens in a second orientation, from a single LC layer whereby the first and second orientations are orthogonal is disclosed in US2008/0266387A1.

The use of LC lens is also proposed in US 2009/0244682, US 2010/0026920, GB 2455614, and US 2011/0032438. US 2011/0032438 proposes the provision of light blocking members at regions where discontinuities occur in the LC lens.

SUMMARY OF THE INVENTION

A first aspect of the invention provides a switchable imaging device, the device having a first mode of operation in which the device performs an imaging function and a second mode of operation different from the first mode; wherein the device comprises an electro-optic layer and a polarising element disposed in the path of light through the electro-optic layer, wherein, in the first mode of operation the electro-optic layer comprises at least one first region that performs a lensing action and at least one second region; and wherein the polarising element acts in co-operation with the second region(s) to at least partially absorb light passing through the or each second region. The first mode may be a directional display mode, for example an autostereoscopic 3-D display mode.

It is of course the case that some small degree of absorption of light inherently occurs in practice when light passes through a real polariser. For the avoidance of doubt, it is to be understood that, in the first mode, the absorption by the polariser of light that has passed through the second region(s) of the electro-optic layer is greater than this inherent absorption. The polariser has greater absorption for light that has passed through the second region(s) than for light that has passed through the first region(s).

A second aspect of the invention provides a switchable optical device comprising a liquid crystal layer, the liquid crystal layer having, in one operating mode of the device, a bulk twisted liquid crystal alignment; wherein at least one first region of the liquid crystal layer is switchable by application of a non-zero voltage across the liquid crystal layer to have, in a second operating mode of the device, a second liquid crystal alignment different from the twisted liquid crystal alignment thereby to define a GRIN lens in the liquid crystal layer.

A third aspect of the invention provides a display comprising an image display panel and a switchable imaging device of the first or second aspect disposed in path of light after passing through the image display panel, i.e. disposed between the image display panel and an observer. This provides a display that may be operable in either a directional display mode such as an autostereoscopic 3D display mode or a 2-D display mode, by controlling the switchable imaging device to be in its first mode or its second mode.

An aspect of the invention comprises a liquid crystal cell that forms a switchable imaging optical device. The switchable imaging optical device can be used in conjunction with an image display, for example, a liquid crystal display (LCD), organic light emitting diode (OLED) display etc. in order to yield a display system that has at least two modes of operation. In a first mode of operation (2D mode), the optical element does not perform an imaging function, thus enabling conventional, high quality 2D images to be viewed on the image display. In a second mode of operation (3D mode), the imaging optical element does perform an imaging function, enabling high quality autostereoscopic 3D images to be viewed on the image display. Switching between the 2D mode and the 3D mode is achieved via the application of an electric field to the liquid crystal layer. In the 3D mode, the optical element forms an array of GRIN lenses and an array of parallax barriers. The parallax barrier regions attenuate the transmission of light. The combination of GRIN lenses and parallax barriers image light from the pixels of the image display to the user's eyes. Consequently, the user is able to view high quality 3D images on the image display.

The switchable imaging optical device combines the positive features of the liquid crystal parallax barrier technology (low manufacturing costs, high image quality in the 2D mode and low 3D crosstalk in the 3D mode) with the positive features of a switchable lens system (high brightness in the 3D mode). Consequently, a superior switchable imaging optical device for the use in 3D and multi-view applications has been realised. The switchable imaging optical device has great design flexibility since the proportion of parallax barrier to GRIN lens ratio can be varied and customised for any given application.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, like references indicate like parts or features:

FIGS. 2*a* and 1*b*: Prior Art.

DESCRIPTION OF REFERENCE NUMERALS

Figure 1A:
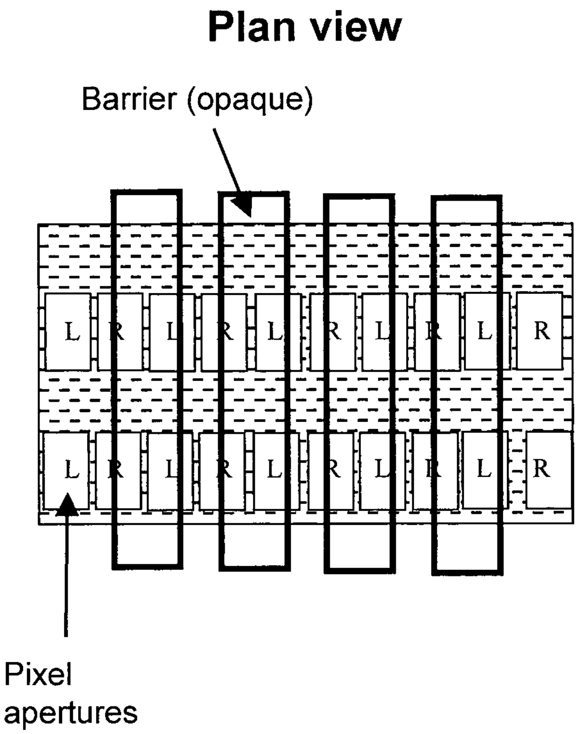
FIGS. 1*a* and 1*b*: Prior Art.
Figure 1B:
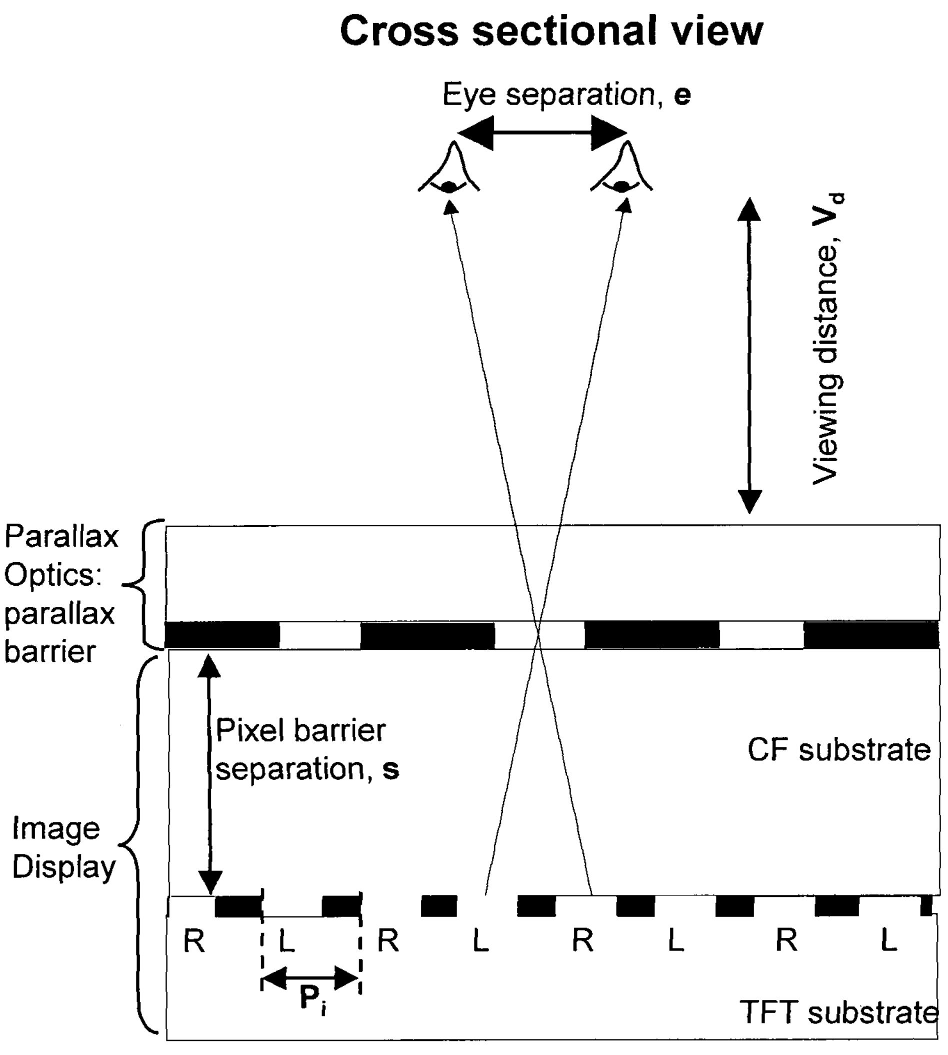
Figure 2A:
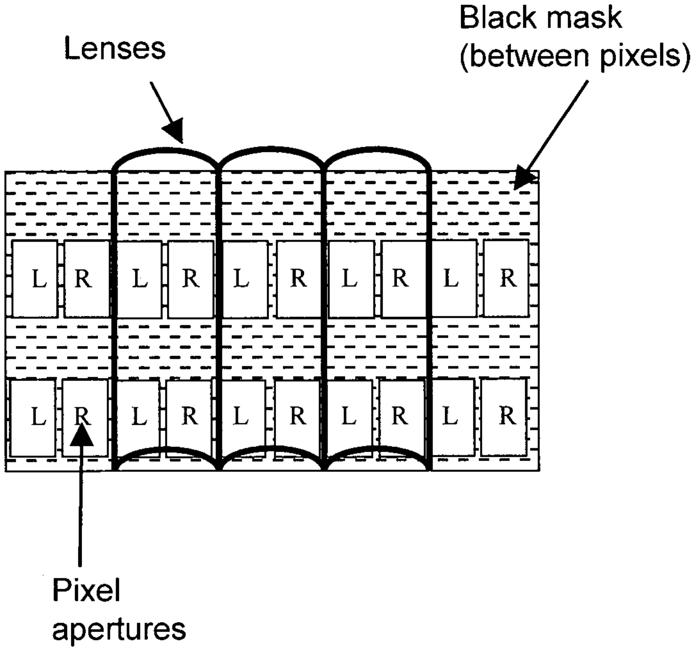
Figure 2B:
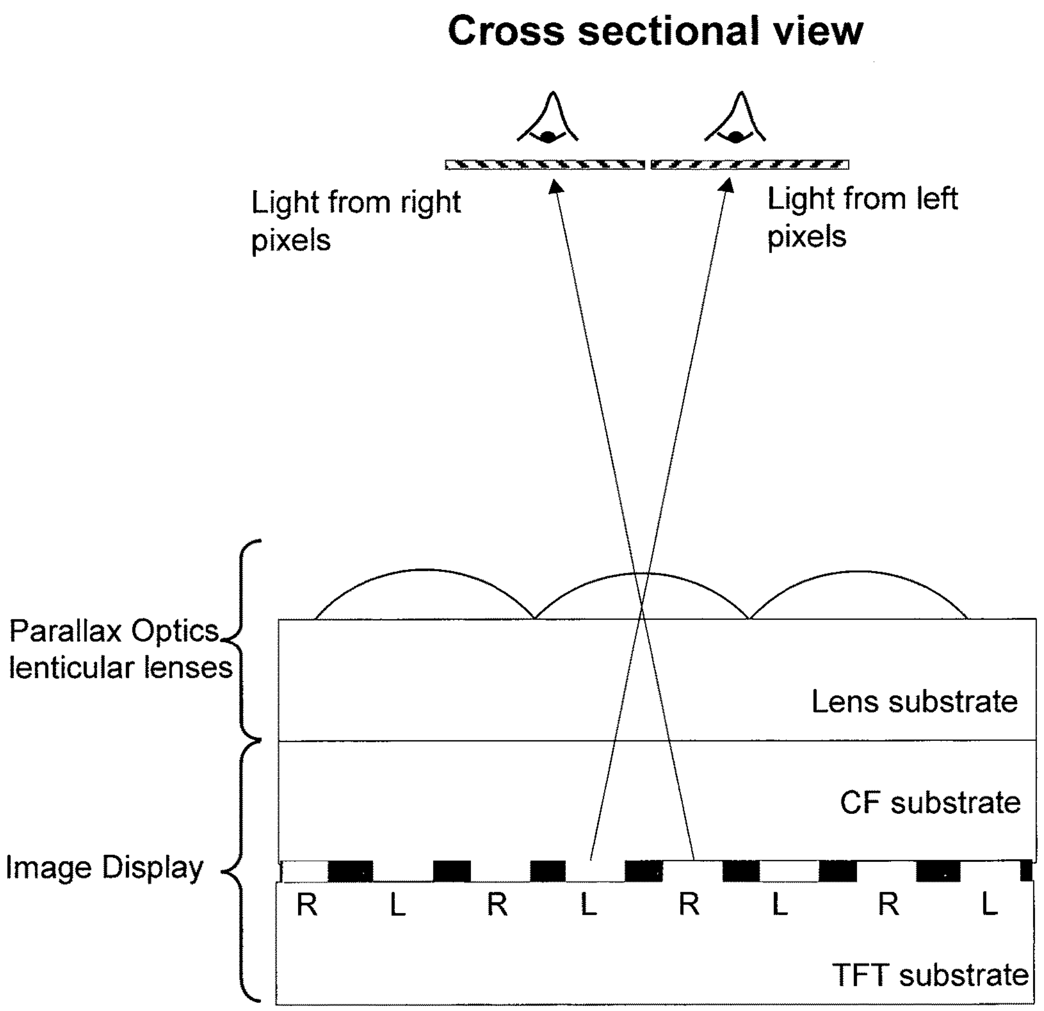

1 switchable imaging optical device
2 liquid crystal layer
4 image display
5 polariser
6 glue layer
7 polariser
8*a* 2D-3D switchable display device in 3D mode
8*b* 2D-3D switchable display device in 3D mode
9*a* left eye
9*b* right eye
11*a* first substrate comprised of an electrode layer and alignment layer
11*b* a first substrate comprised of an electrode layer and alignment layer
12 a second substrate comprised of an electrode layer and alignment layer
21 a lens array
21*b* a picture of a physical lens
21*c* a picture of a physical lens
22 a parallax barrier array
23 a region of liquid crystal beneath a patterned electrode
24 functional form (lateral extent and brightness) of the parallax barrier region
25 micrograph of GRIN lens focus
26 micrograph of parallax barrier
41 a first substrate of the image display
42 a second substrate of the image display
43 pixels of the image display
50 Liquid crystal cell edge seal
51 Liquid crystal cell spacer
111 a first substrate
112, 112*a*, 112*b* an electrode layer pertaining to the first substrate
113 an alignment layer pertaining to the first substrate
121 a second substrate
122, 122*a*, 122*b* an electrode layer pertaining to the second substrate
1221*a* a first electrode layer pertaining to the second substrate
123 an alignment layer pertaining to the second substrate
124 spatial extent image display
1221 width of the electrode pertaining to the second substrate
1222 pitch of the electrode pertaining to the second substrate
1221*b* width of an electrode pertaining to the second substrate
DS1 a first electrical drive scheme
DS2 a second electrical drive scheme
L1 Luminance response as a function of x
L2 Luminance response as a function of x

DESCRIPTION OF EMBODIMENTS

Figure 6:
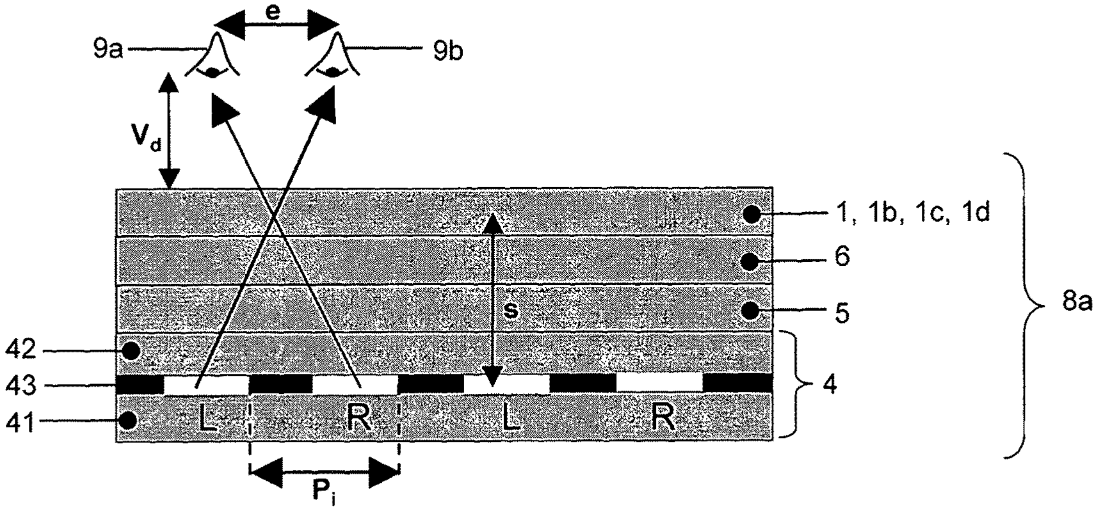
FIG. 6: Switchable imaging optic and image display.
Figure 7:
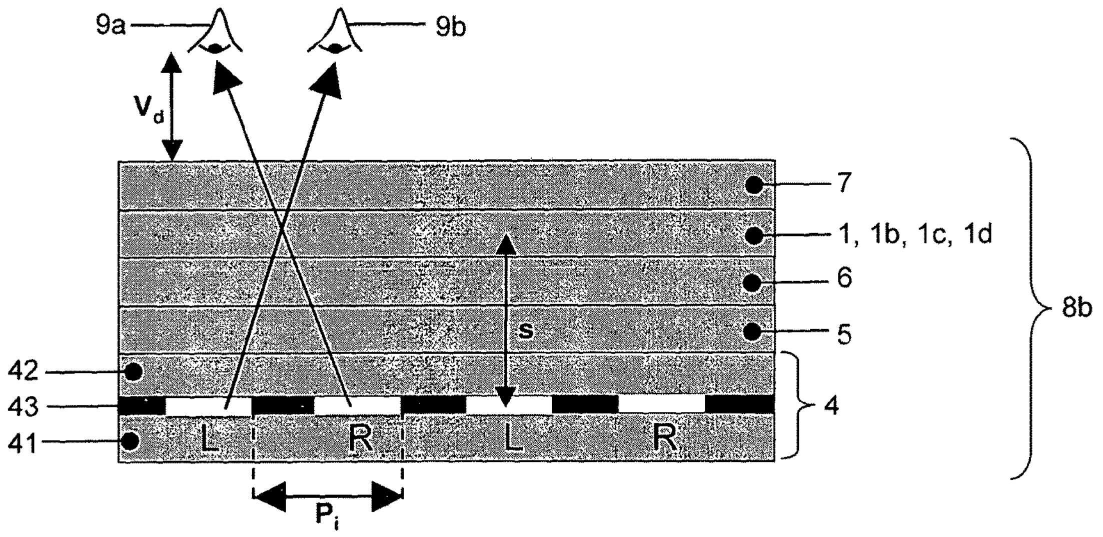
FIG. 7: Switchable imaging optic and image display.

With reference to FIGS. 3*a* and 3*b*, FIGS. 4*a* and 4*b* and FIGS. 5*a* and 5*b*, a switchable imaging optical device 1 is fabricated that comprises a liquid crystal cell. With reference to FIG. 6 and FIG. 7 the switchable imaging optical device 1 is then combined with an image display 4 to yield a 2D-3D switchable display system.

Figure 3A:
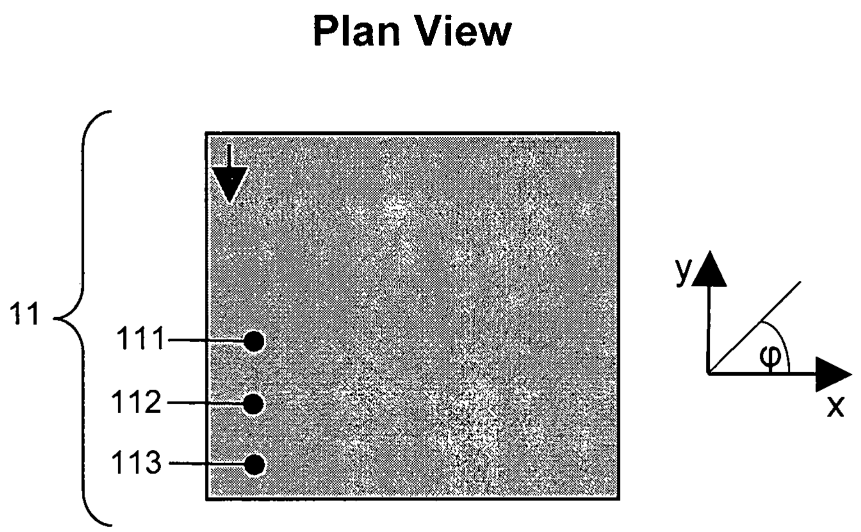
FIG. 3*a*: Plan View of first substrate of switchable imaging optic.
Figure 3B:
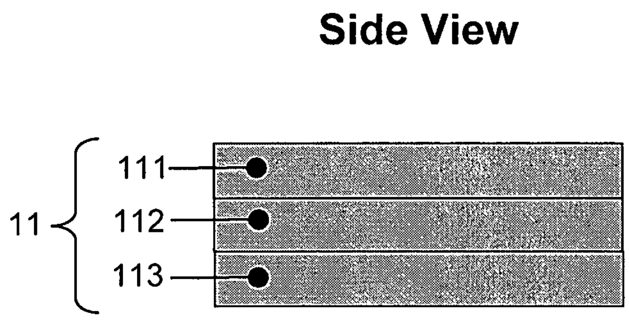
FIG. 3*b*: Side View of first substrate of switchable imaging optic.
Figure 4A:
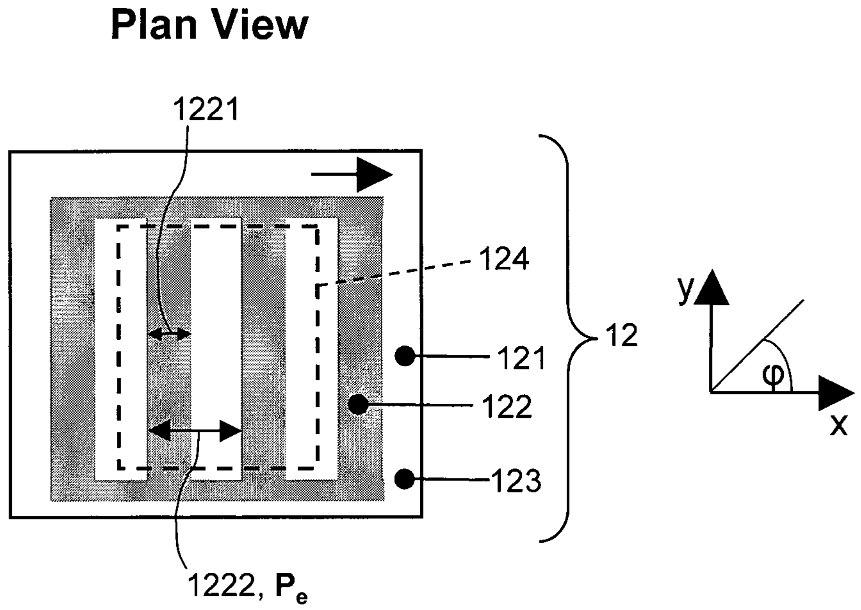
FIG. 4*a*: Plan View of second substrate of switchable imaging optic.
Figure 4B:
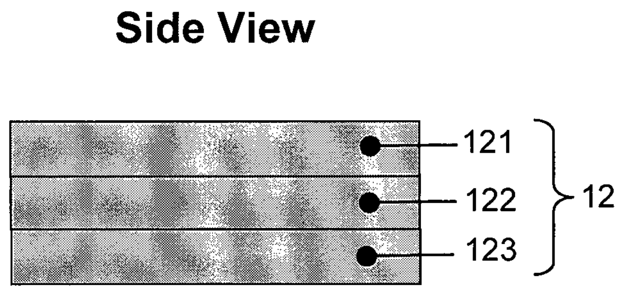
FIG. 4*b*: Side View of second substrate of switchable imaging optic.
Figure 5A:
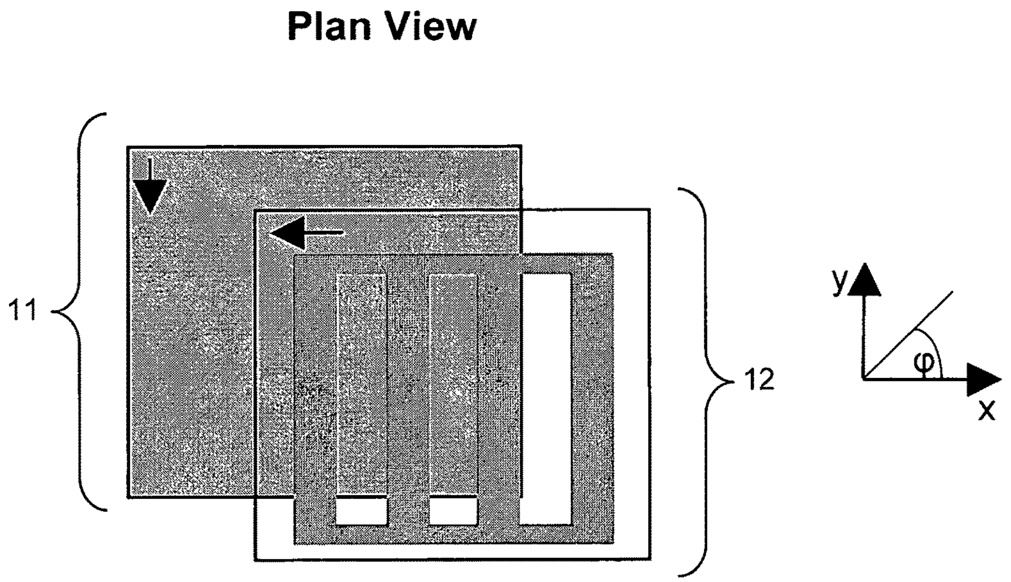
FIG. 5*a*: Plan View of switchable imaging optic.
Figure 5B:
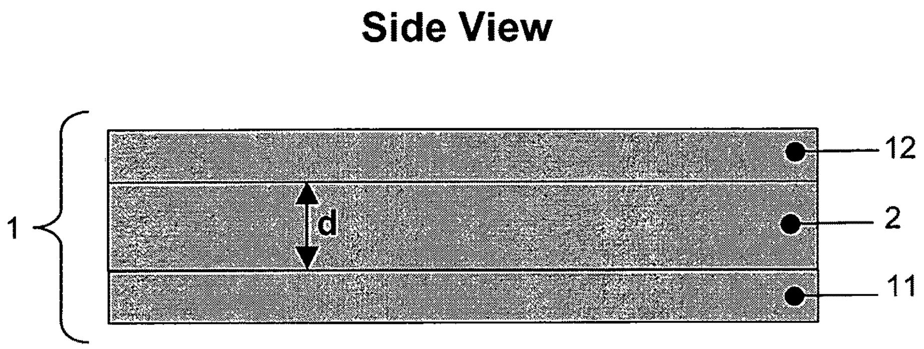
FIG. 5*b*: Side View of switchable imaging optic.

With reference to FIGS. 3*a* and 3*b*, FIGS. 4*a* and 4*b* and FIGS. 5*a* and 5*b*, fabrication of the switchable imaging optical device 1 will now be described. The first substrate 111 (shown face up in FIG. 3*a*) and second substrate 121 (shown face up in FIG. 4*a*) are coated with transparent electrodes 112, 122 respectively, for example, indium tin oxide (ITO). The electrode layer 122 of the second substrate 121 is patterned in a pre-determined fashion, as illustrated by FIG. 4*a*. The dashed line 124 in FIG. 4*a* shows the approximate spatial extent of the pixelated area of the image display 4. For a 2-View 3D display system which has 1 pixel per image, the pitch 1222, $P_e$ of the electrode is arranged to be approximately twice the pixel pitch of the image display 4. In order to correct for view point, the exact electrode pitch 1222, $P_e$, is arranged to be equal to $(2*P_i)/(1+s/e)$, where $P_i$ is the pixel pitch of the image display 4, s is the distance between the image display pixels 43 and the liquid crystal layer 2 and e is the eye separation distance (typically 65 mm). The width 1221 of the electrode may be between 1% and 65% of the electrode pitch 1222. As a general rule, setting the width 1221 of the electrode to be commensurate with the liquid crystal layer 2 thickness, d, was found to produce good 3D performance and provided a basis for subsequent optimisation. The first substrate 111 with electrode 112 and second substrate 121 with electrode 122 are then coated with a standard liquid crystal alignment layer 113, 123 respectively, for example, PI2555 (Dow Corning). The alignment layers are then baked and rubbed in a standard fashion in order to induce a uniform planar alignment of liquid crystal material. FIG. 3*a* illustrates the first substrate with substantially unpatterned electrode and rubbed alignment layer (alignment layer uppermost) and direction of rubbing shown with arrow, $\phi_1=270°$. FIG. 4*b* illustrates the second substrate with patterned electrode and rubbed alignment layer (alignment layer uppermost) and direction of rubbing shown with a single-headed arrow, $\phi_2=0°$. With reference to FIGS. 5*a* and 5*b*, the first substrate 11 (alignment layer uppermost) and second substrate 12 (alignment layer lowermost) are then spaced a predetermined distance apart facing each other, with the respective alignment layer rubbing directions and orientated at 90° to each other. Note: the rubbing direction of the second 12 substrate has been mirrored in a vertical plane because the alignment layer is now shown as the lowermost layer, so the rubbing direction, $\phi_2$, now appears be $\phi_{2=180}$° when viewed from above. The first substrate 11 and second substrate 12, are then spaced a predetermined distance apart, d, and glued together (Norland Optical Adhesive 91) to form a cell and a liquid crystal material 2 is then injected into the cell. The thickness of the liquid crystal layer 2, d can be derived to a first approximation from the formula $d=W^2/(8*f*\Delta n)$ where W is the lens width ($W=P_e$ for this example), f is the focal length of the lens in air and Δn is the birefringence of the liquid crystal material. The focal length of the lens is arranged to be approximately at the plane of the pixels of the image display 43. The liquid crystal material is a mixture of liquid crystal and chiral dopant, for example, MDA-03-272A (Merck) and chiral dopant, for example R811 (Merck). The chiral pitch of the resulting liquid crystal mixture is generally significantly larger (~×20), than the thickness of the liquid crystal cell. The chirally doped liquid crystal mixture cooperates with the rubbed alignment layers in a standard fashion to form a uniform liquid crystal structure that twists through 90° from the first substrate 11 to the second substrate 12 when no voltage is applied to the electrodes 112, 122. Alternatively, a uniform liquid crystal structure that twists through 90° from the first substrate 11 to the second substrate 12 can be achieved using no chiral dopant and liquid crystal alignment layers on the first substrate 11 and the second substrate 12 that induces an appreciable surface pretilt (>~2°). This completes the fabrication of the switchable imaging optical device 1.

With reference to FIG. 6, the switchable imaging optical device 1 is combined with an image display 4 to realise a first switchable 2D-3D display system 8*a*. An image display 4 that is comprised of a lower substrate 41, a pixel layer 43, an upper substrate 42 and a film for controlling polarisation 5 are arranged such that the light output from the image display 4 is linearly polarised and oriented parallel to the rubbing direction of the lower-most substrate of the switchable imaging optical device 1. The lower-most substrate of the switchable imaging optical device 1 (i.e. the substrate closest to the image display 4) may be either the first substrate 11 or the second substrate 12. The film for controlling polarisation 5 may be intrinsic or extrinsic to the operation of the image display 4. The switchable imaging optical device 1 is then adhered to the image display 4 using optical glue 6, for example, Norland Optical Adhesive 65 to form a 2D-3D switchable display system. For a 2-View 3D display system, the distance, s, between the pixels of the image display and the liquid crystal layer of the switchable imaging optical device is arranged according to the formula $s=(V_d \cdot P_i \cdot n)/e$ where $V_d$ is the desired viewing distance of the display system, $P_i$ is the pitch of the pixels on the image panel 4, e is the eye separation distance (typically e~65 mm) and n is the average refractive index of the material between the pixels of the image display 4 and the liquid crystal layer 2 of the switchable imaging optical device 1 (typically n~1.52). For the viewing of autostereoscopic 3D images, the image panel 4 has pixel information for the left and right eye interlaced on alternate pixels. The lateral position of the switchable imaging optical device 1 relative to the image display 4 is arranged so that an on-axis user receives right eye pixel information, R, with their right eye 9*a* and receives left eye pixel information, L, with their left eye 9*b*.

With reference to FIG. 7, the switchable imaging optical device 1 is combined with an image display 4 to realise a second switchable 2D-3D display system 8*b*. The switchable 2D-3D display systems 8*a* and 8*b* are identical except for the addition of a linear polariser 7 adhered to the switchable 2D-3D display system 8*b* (FIG. 7). The linear polariser 7 is adhered to the outer-most substrate of the switchable imaging optical device 1 (substrate furthest from the image display 4) such that the transmission axis of linear polariser 7 is oriented at 90° to the transmission axis of the linearly polarising element 5. The polarisation elements 5 and 7 are therefore crossed; the switchable imaging optical device 1 is therefore required to convert or rotate the polarisation state of light passing through it in order for light to exit the polariser 7. This completes the fabrication of the switchable 2D-3D display systems 8*a* and 8*b*.

Figure 8:
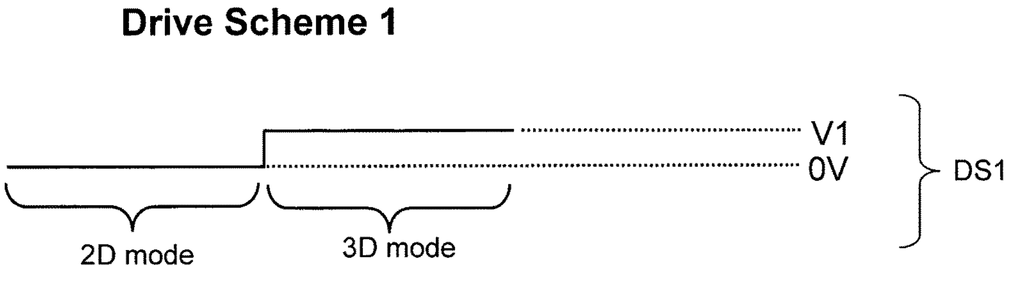
FIG. 8: Switchable imaging optic Drive Scheme 1.

With reference to FIG. 8, a first driving scheme DS1 for the switchable imaging optical device 1 is proposed. With zero potential difference between the first electrode 112 and the second electrode layer 122, no imaging function is performed by the switchable imaging optical device 1 and consequently the display systems 8*a* and 8*b* enables viewing of 2D images with the full native resolution of the image display 4. In practice, this is achieved by applying 0 volts to both the first electrode 112 and second electrode 122. To enable the viewing of 3D images on the display systems 8*a* and 8*b,* 3D image content must be addressed to the image display 4 and the switchable imaging optical device 1 must be switched to perform an imaging function. The imaging function is activated via the application of a potential difference between the first electrode 112 and the second electrode 122 of V1 volts, where V1 is the root mean square (rms) voltage. Typically, V1 is typically between 2V and 15V with a preferred value of around 3-7V. The voltage V1 can be tuned to optimize the 3D performance of a given display systems 8*a* and 8*b* in situ. As according to standard liquid crystal drive schemes, changing the polarity of the applied voltages (between 25 Hz and 1000 Hz) while maintaining the magnitude of the applied voltage is advantageous in order to prevent image sticking.

Figure 9:
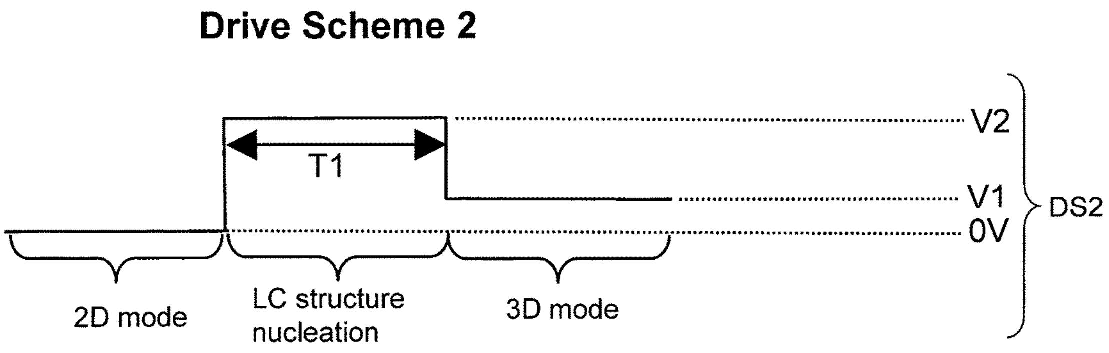
FIG. 9: Switchable imaging optic Drive Scheme 2.

With reference to FIG. 9, a second driving scheme DS2 for the switchable imaging optical device 1 is proposed. The imaging function is activated via the application of a potential difference between the first electrode 112 and the second electrode 122 of V2 volts for time T1 followed by the application of a potential difference between the first electrode 112 and the second electrode 122 of V1 volts. The voltages V1 and V2 are rms voltages. Typically, V2 is between 10V and 80V with a preferred value of around 50V. Typically, T1 is between 0.2 seconds and 6 seconds with a preferred value of around 2 seconds. Typically, V1 is between 2V and 15V with a preferred value of around 4-7V. The voltage V1 can be tuned to optimize the 3D performance of a given display systems 8*a* and 8*b* in situ. During the time T1, a new liquid crystal structure is nucleated. The nucleated LC structure is energetically stable at V1 volts. As according to standard liquid crystal drive schemes, changing the polarity of the applied voltages (between 25 Hz and 1000 Hz) while maintaining the magnitude of the applied voltage is advantageous in order to prevent image sticking.

Microscopic analysis revealed that unwanted liquid crystal structures could form when liquid crystal cell gap gradients occur in the vicinity of fringing electric fields from electrode edges. Patterning of the edge seal (glue line) and/or patterning of the liquid crystal cell spacers may prevent liquid crystal cell gap gradients occurring in the vicinity of fringing electric fields from electrode edges.

Figure 29:
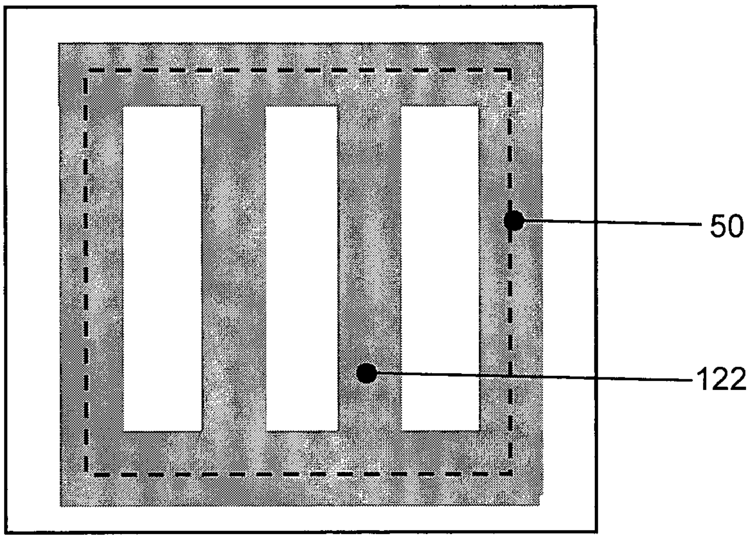
FIG. 29: Edge seal positioning relative to the electrode structure.

To prevent the formation of unwanted liquid crystal structures, the edge seal (glue line) may optionally be positioned away from the vicinity of fringing electric fields that come from the edge of electrode 122. With reference to FIG. 29, the edge seal 50 (dashed line) may be positioned on top of the electrode 122 and away from the edges of the electrode 122. Alternatively, the edge seal (50) may be positioned not on top of the electrode 122 and away from the edges of the electrode 122, for example near the substrate boundary (the full line in FIG. 29).

Figure 30A:
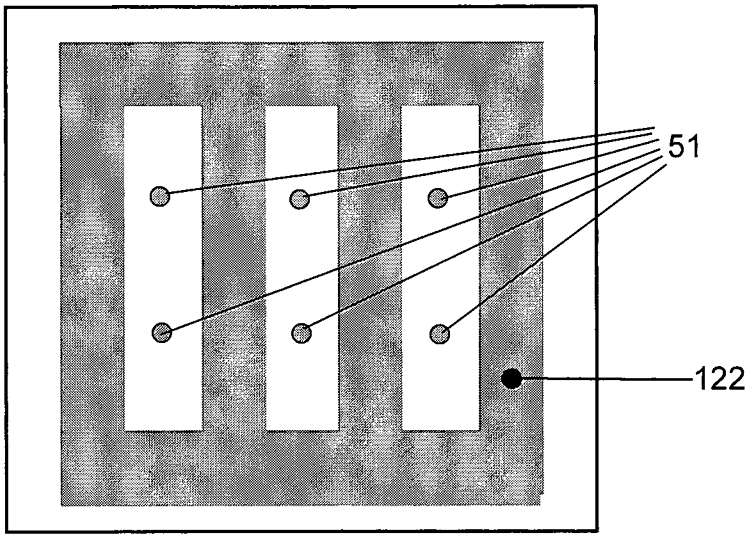
FIG. 30*a*: Positioning of liquid crystal spacers relative to the electrode structure.
Figure 30B:
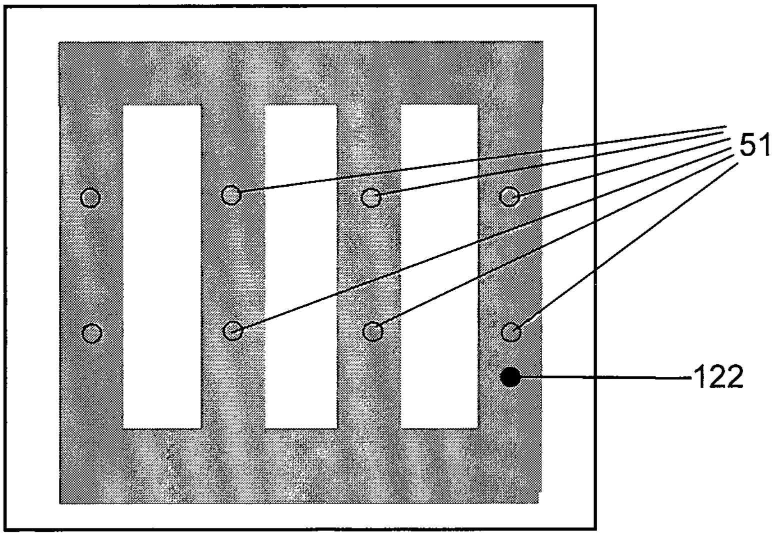
FIG. 30*b*: Positioning of liquid crystal spacers relative to the electrode structure.

Additionally or alternatively, to prevent the formation of unwanted liquid crystal structures, liquid crystal cell spacers may optionally be positioned away from the vicinity of fringing electric fields that come from the edge of electrode 122. With reference to FIG. 30*a* and FIG. 30*b*, the liquid crystal cell spacers 51 may be positioned away from the edge of the electrode 122. The liquid crystal cell spacers 51 may be positioned between the electrode fingers (FIG. 30*a*) and/or the liquid crystal cell spacers 51 may be positioned on top of the electrode fingers (FIG. 30*b*). The liquid crystal cell spacers may be patterned using a photolithographic technique. The shape of the liquid crystal cell spacers may be circular, cylindrical, rectangular etc. The shape of the liquid crystal cell spacers may regular and/or irregular. The distribution of the spacer may be uniform or non-uniform. The density distribution of the liquid crystal cell spacers should be high enough to ensure a reliable, uniform cell gap. The density distribution of the liquid crystal cell spacers should be low enough to ensure a good quality imaging of the optical element is still obtained. The area density of the liquid crystal cell spacers may be in the range 10% to 0.01%.

The following switchable 2D-3D display system was constructed and driven using the following parameters: liquid crystal thickness, d=20 μm, liquid crystal birefringence, Δn=0.20, chiral pitch of liquid crystal=400 μm, electrode width 1221=16 μm, electrode pitch, $P_e$=206.686 μm, pixel pitch, $P_i$=103.5 μm, rubbing direction of the first substrate (alignment layer uppermost) $\phi_1$=270°, rubbing direction of the second substrate (alignment layer uppermost) $\phi_2$=0°, s=950 μm, V1=5V, V2=50V, T1=3 s. Plots that record the optical response at $V_d$~400 mm are shown in FIG. 10, FIG. 11, FIG. 12, FIG. 13 and FIG. 14.

Figure 10:
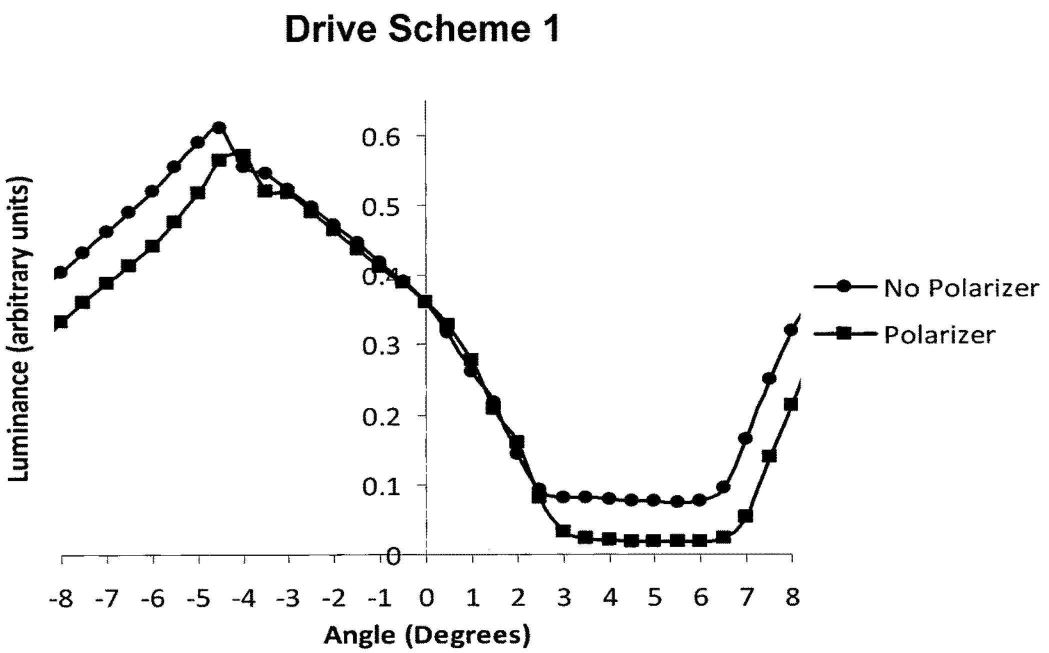
FIG. 10: Plot of luminance against viewing angle for Drive Scheme 1.

With reference to FIG. 6, FIG. 7 and FIG. 8, the angular dependant brightness of display system 8*a* (circles) and 8*b* (squares), driven with Drive Scheme 1 (DS1) is shown in FIG. 10. The image displayed on image display 4 contains left eye pixels that are turned on and right eye pixels that are turned off. Between −4° and −5°, it is calculated from FIG. 10 that the peak brightness of display system 8*b* (squares) is approximately ~7% darker than display system 8*a* (circles). Consequently, in terms of 3D mode brightness, there is little difference between display system 8*a* (circles) and 8*b* (squares) using Drive Scheme 1 (DS1).

Figure 11:
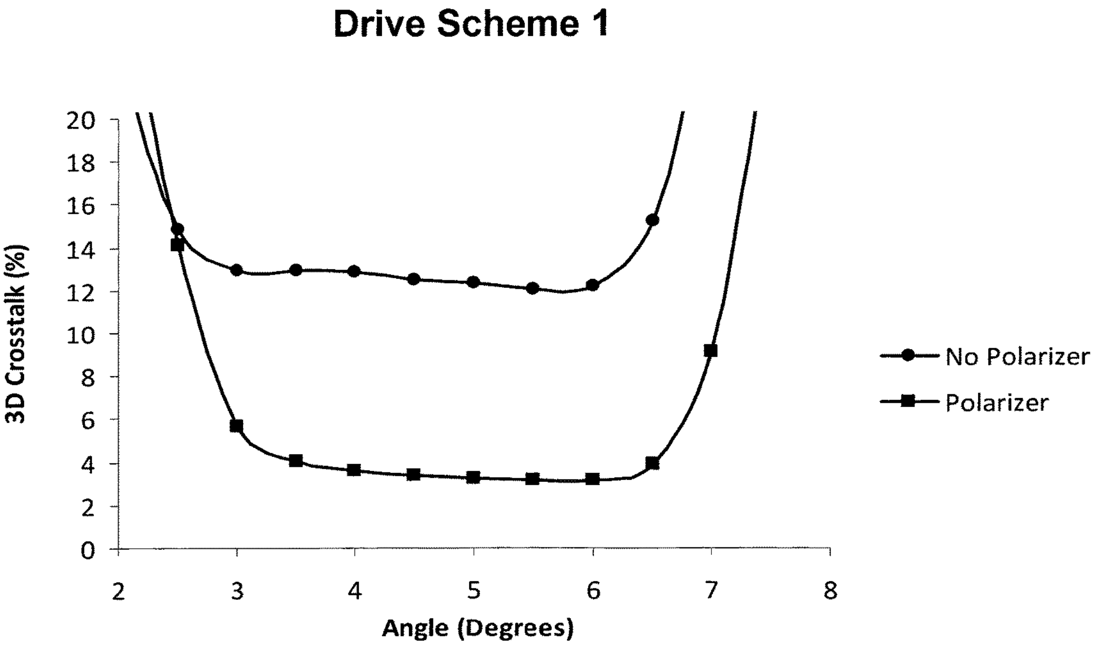
FIG. 11: Plot of 3D Crosstalk against viewing angle for Drive Scheme 1.

A plot of self-normalised 3D crosstalk for display system 8*a* (circles) and 8*b* (squares), driven with Drive Scheme 1 (DS1) is shown in FIG. 11. FIG. 11 is derived from FIG. 10 and illustrates the amount of left eye information that is seen with the right eye (3D Crosstalk). Between 3° and 6.5°, it is clear from FIG. 11 that 3D crosstalk of display system 8*b* (squares) is lower than display system 8*a* (circles). Consequently, display system 8*b* (squares) exhibits a better quality 3D mode than display system 8*a* (circles).

Figure 12:
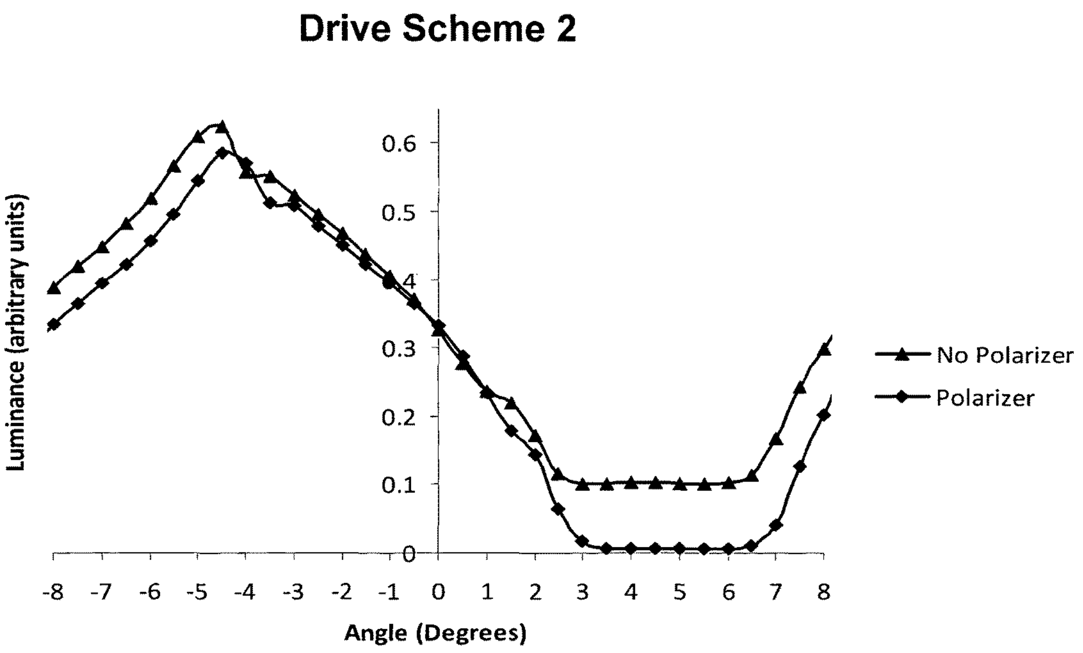
FIG. 12: Plot of luminance against viewing angle for Drive Scheme 2.

With reference to FIG. 6, FIG. 7 and FIG. 9, the angular dependant brightness of display system 8*a* (triangle) and 8*b* (diamond), driven with Drive Scheme 2 (DS2) is shown in FIG. 12. The image displayed on image display 4 contains left eye pixels that are turned on and right eye pixels that are turned off. Between −4° and −5°, it is calculated from FIG. 12 that the peak brightness of display system 8*b* (diamond) is approximately ~0.7% darker than display system 8*a* (triangle). Consequently, in terms of 3D mode brightness, there is little difference between display system 8*a* (triangle) and 8*b* (diamond) using Drive Scheme 2 (DS2).

Figure 13:
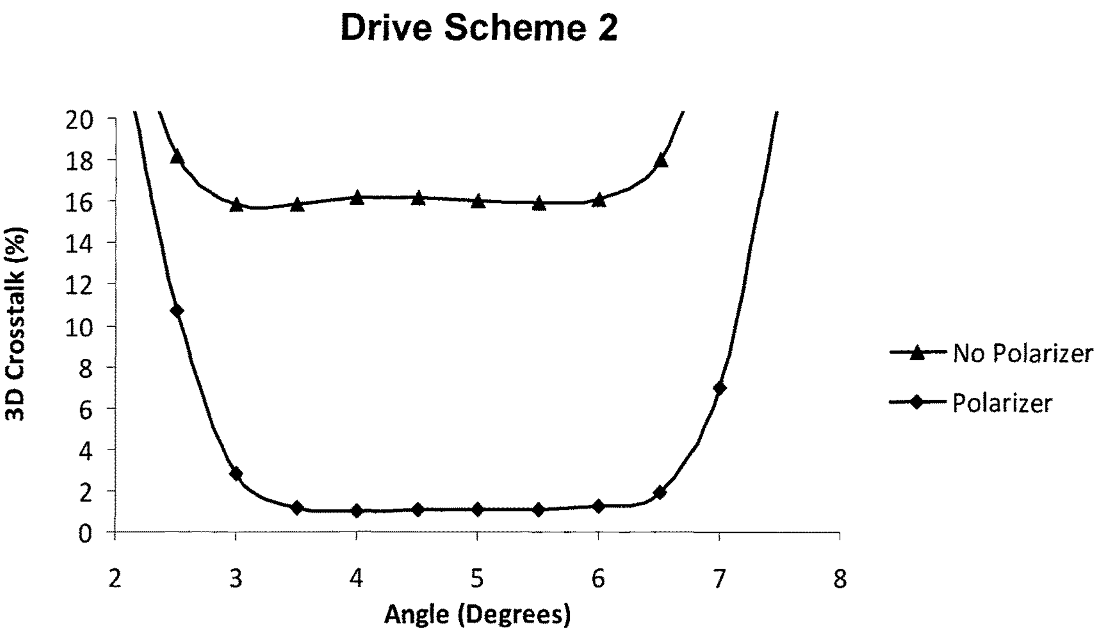
FIG. 13: Plot of 3D Crosstalk against viewing angle for Drive Scheme 2.

A plot of self-normalised 3D crosstalk for display system 8*a* (triangles) and 8*b* (diamonds), driven with Drive Scheme 2 (DS2) is shown in FIG. 13. FIG. 13 is derived from FIG. 12 and illustrates the amount of left eye information that is seen with the right eye (3D Crosstalk). Between 3° and 6.5°, it is clear from FIG. 13 that 3D crosstalk of display system 8*b* (diamonds) is lower than display system 8*a* (triangles). Consequently, display system 8*b* (diamonds) will exhibit a better quality 3D mode than display system 8*a* (triangles).

Figure 14:
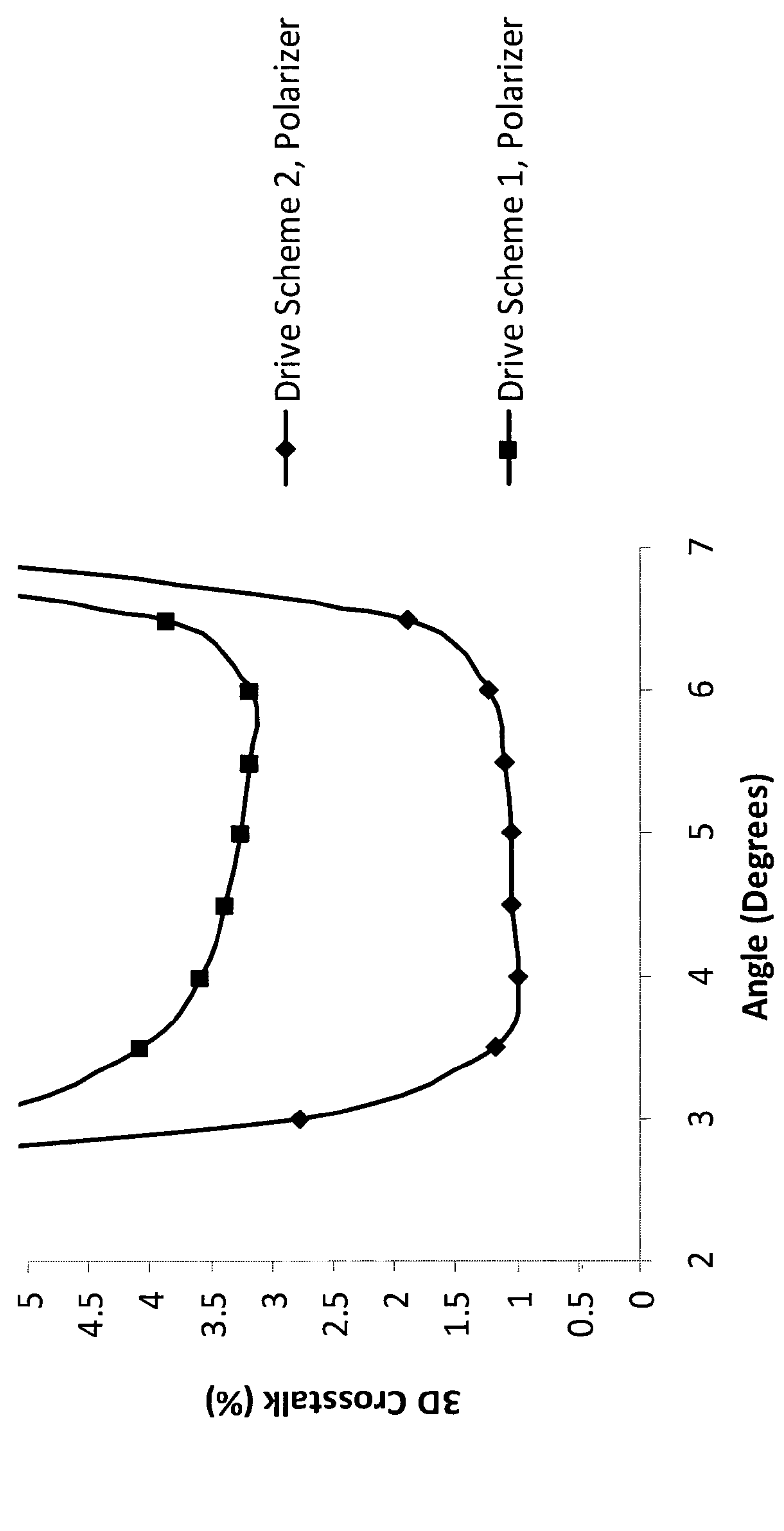
FIG. 14: Plot of 3D Crosstalk against viewing angle for Drive Scheme 1 and Drive Scheme 2.

For completeness, a plot of self-normalised 3D crosstalk for display system 8*b* driven with Drive Scheme 1, DS1 (squares), and Drive Scheme 2, DS2, (diamonds) is shown in FIG. 14. Between 3° and 6.5°, it is clear from FIG. 14 that 3D crosstalk of Drive Scheme 2 (diamonds) is much lower than Drive Scheme 1 (squares). Consequently, display system 8*b* will exhibit a better quality 3D mode when driven with Drive Scheme 2 (DS2). However, Drive Scheme 1 has the advantage that it is simpler and cheaper to implement that Drive Scheme 2. Drive Scheme 1 also has the advantage that it is quicker to switch into the 3D mode than Drive Scheme 2. It is quite conceivable that further optimisation of LC cell parameters, such drive voltage, cell thickness, electrode width, rubbing conditions, LC material etc. would enable similar 3D performance to be achieved using Drive Scheme 1 and Drive Scheme 2.

Figure 15A:
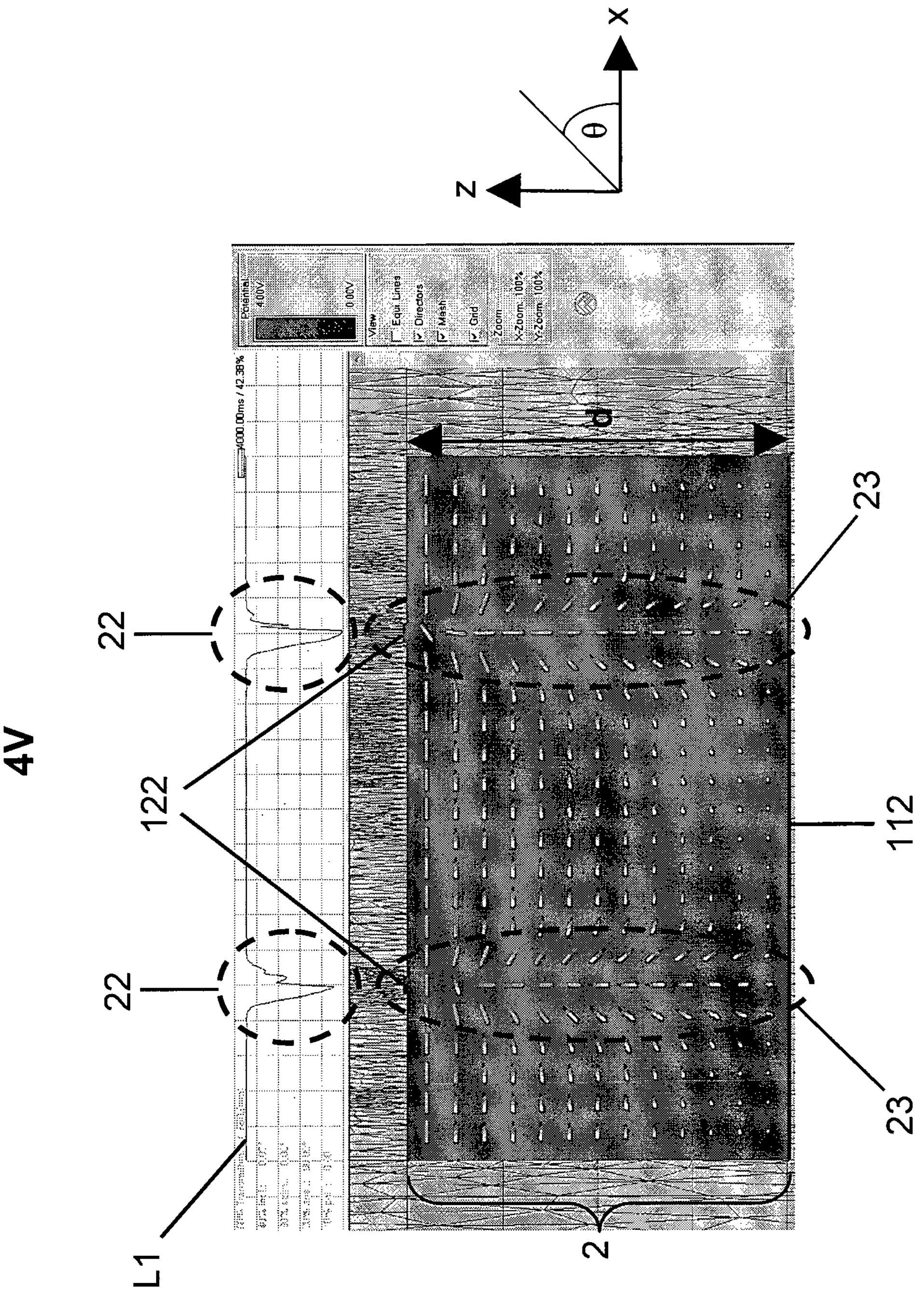
FIG. 15*a*: Modelling switchable imaging optic at 4V.

With reference to FIG. 15*a*, the liquid crystal layer 2 of the switchable optical imaging device 1 has been modelled. The width of the electrode 122 is 20 μm, the thickness of the liquid crystal layer is 20 μm, the birefringence (Δn) of the liquid crystal layer is 0.20. The surface alignment directions of the liquid crystal are as depicted in FIG. 5. The electrode 112 has been set to 0V and the electrodes 122 have been set to 4V (i.e. V1=4V). The region of liquid crystal 23 that is situated beneath the electrodes 122 are substantially vertically aligned and parallel to the electric field lines produced by the electrodes 122, 112. Owning to the orientation of crossed polarisers as depicted in FIG. 7 (the polariser axes are aligned with the surface liquid crystal alignment directions), the resulting on-axis optical transmission L1 of the liquid crystal layer 2 shows a drop in transmission 22 at the spatial location of the electrodes 122. The switchable optical imaging device 1 therefore yields a switchable parallax barrier that absorbs light. The amount of light absorbed by the parallax barrier varies in the x direction, as shown by L1. The tilt angle, θ, of the liquid crystal molecules between the patterned electrodes 122 varies as a function of x, thus a Graded Refractive INdex (GRIN) lens structure is also realised. The edge of the GRIN lens is situated beneath the electrodes 122 and the middle of the GRIN lens structure is situated between the electrodes 122. The imaging properties of the switchable optical imaging device 1 are a function of the switchable parallax barrier region and the switchable GRIN lens region. By removing the uppermost polariser 7, the parallax barrier part of the switchable optical imaging device 1 is also removed since there is no polariser to absorb light exiting from the switchable optical imaging device 1. With reference to FIG. 6, switchable optical imaging device 1 is operating as a switchable GRIN lens only. With reference to FIG. 7, switchable optical imaging device 1 is operating as a switchable GRIN lens and a switchable parallax barrier. With reference to FIG. 11 and FIG. 13, the 3D crosstalk of display system 8*b* is superior to display system 8*a* and consequently, the switchable parallax barrier is a desirable, although optional, feature of the switchable optical imaging device 1.

Figure 15B:
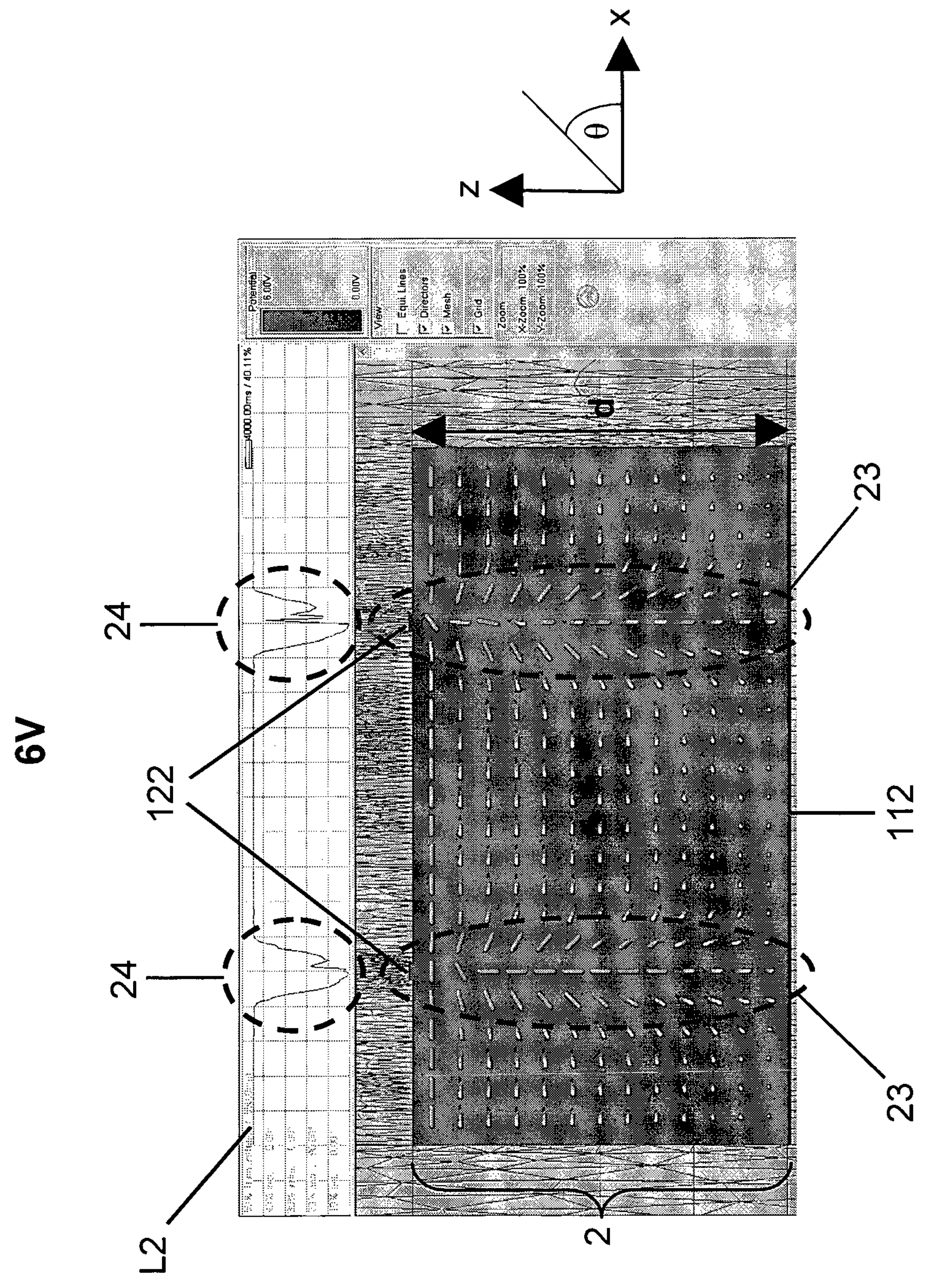
FIG. 15*b*: Modelling switchable imaging optic at 6V.

FIG. 15*b* depicts the same arrangement of optical components as shown in FIG. 15*a*, except that the voltage on the electrodes 122 has increased to 6V (i.e. V1=6V). The increase in voltage causes more liquid crystal molecules to align vertically 23 beneath the electrodes 122 which changes the details of the on-axis transmission function L2 by increasing the lateral extent of the parallax barrier region 24. The increase in voltage also changes the tilt function form of the liquid crystal molecules situated between the electrodes 122, which in turn also changes the imaging properties of the GRIN lens region. It has therefore been demonstrated that by varying the voltage V1, the imaging properties of the switchable optical imaging device 1, which are governed by a first spatial region of parallax barrier and a second spatial region of GRIN lens, can be controlled and therefore optimised for a given display systems 8*a* and 8*b*. By studying FIGS. 15*a* and 15*b*, it is intuitively obvious that by changing the width of the electrode 122, the lateral extent of the parallax barrier region will also change. An increase in the width of the electrode 122 corresponds to an increase in the lateral extent of the parallax barrier region 22, 24. The width of the electrode 122 can also affect the imaging properties of the switchable optical imaging device 1 can and therefore be optimised for a given display systems 8*a* and 8*b*.

Figure 16:
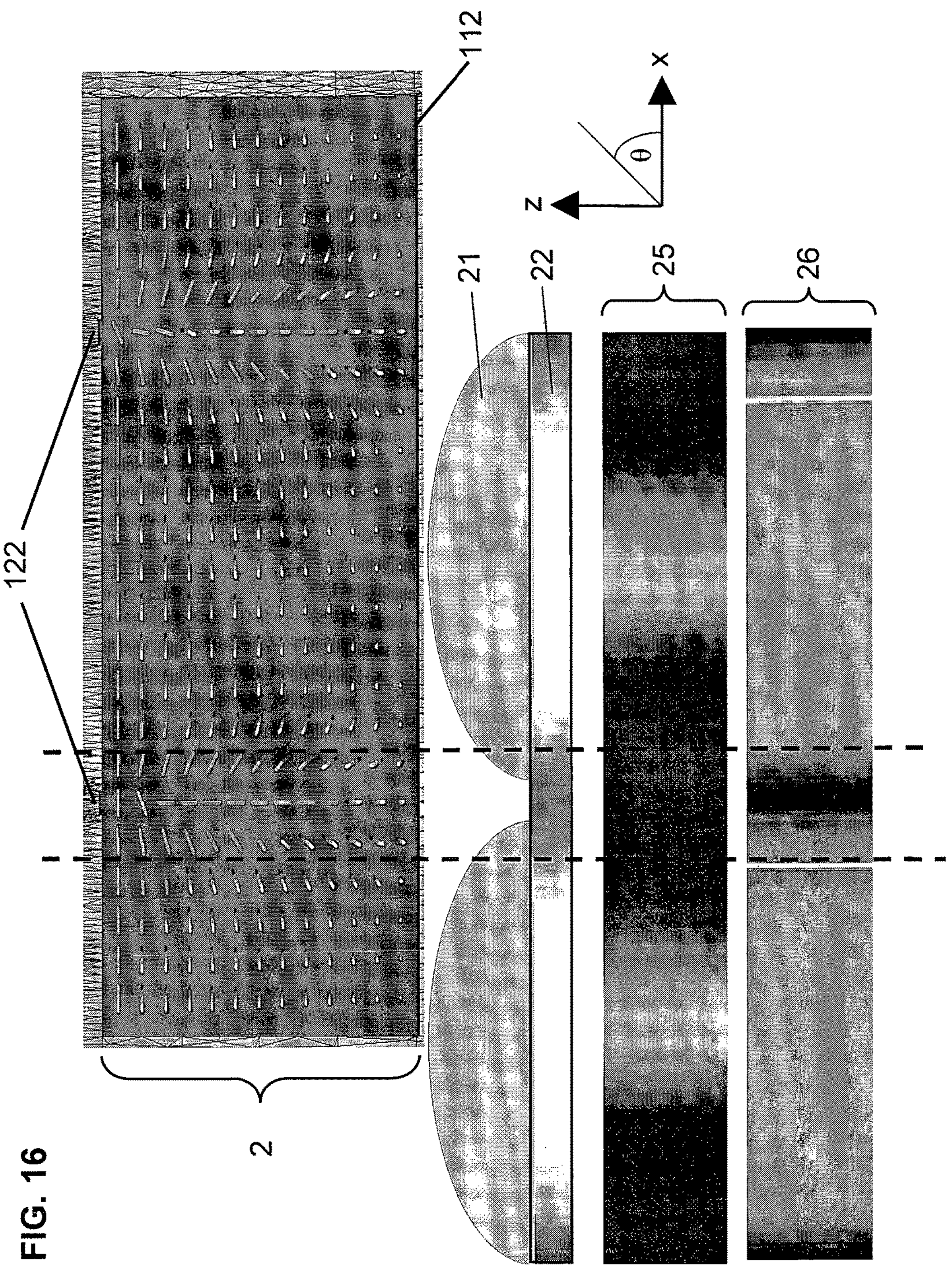
FIG. 16: Micrographs of the GRIN lens focus and parallax barrier.

FIG. 16 depicts, from top to bottom, modelling of the liquid crystal layer 2 of the switchable optical imaging device 1, a lens array 21 and parallax barrier array 22, a micrograph of the GRIN lens focus 25 and micrograph of the parallax barrier 26. The objects 2, 21 and 22 have been aligned laterally (same x position), enabling the modelling of the liquid crystal layer 2 to coincide with the depiction of the lens 21 and parallax barrier. The objects 2, 25 and 26 have also been aligned laterally (same x position), enabling the modelling of the liquid crystal layer 2 to coincide with the micrographs of the lens focus 25 and parallax barrier 26. The liquid crystal beneath the electrode 122 is substantially vertically aligned by the applied electric field and the width of the resulting parallax barrier is shown by the micrograph 26. The micrograph shows that the focal position of the GRIN lens occurs between the parallax barrier regions. In order to aid operational understanding of the switchable optical imaging device 1, a schematic representation of a lens array 21 and parallax barrier array 22 are shown.

It will be noted that the two GRIN lens are shown in FIG. 16 as just touching one another. Whether two adjacent GRIN lens touch one another or not will depend on the width of the electrodes 122, and if the electrodes 122 were wider adjacent GRIN lenses would not touch one another so that there would be a gap between adjacent GRIN lenses. The presence of a gap between adjacent GRIN lenses does not affect the optical performance, however, as the light-attenuating region will coincide with the gap between adjacent GRIN lenses thereby preventing optical cross-talk. (Increasing the width of the electrodes 122 will not affect the position of the apex of the GRIN lens, assuming that all electrodes 122 still have the same width as one another.)

Figure 17:
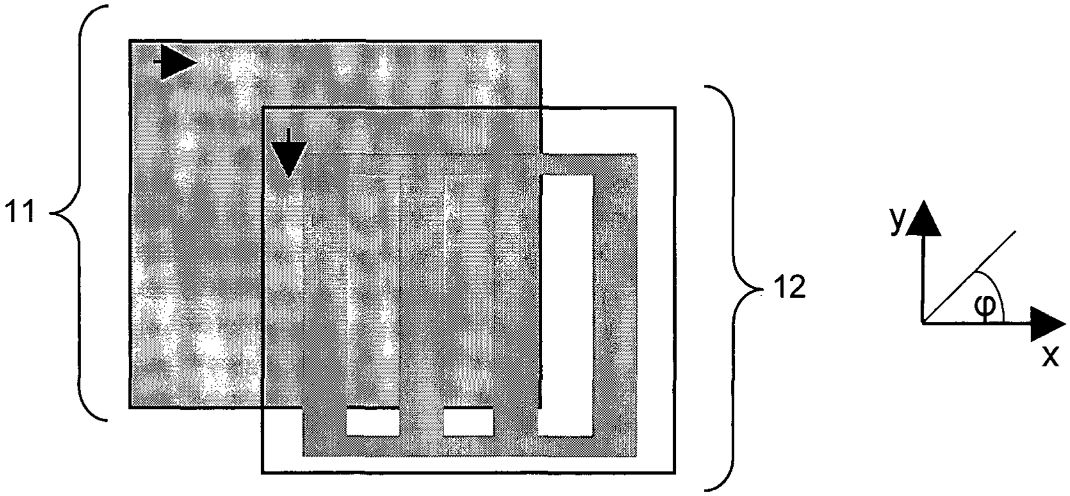
FIG. 17: Plan View of switchable imaging optic.
Figure 18:
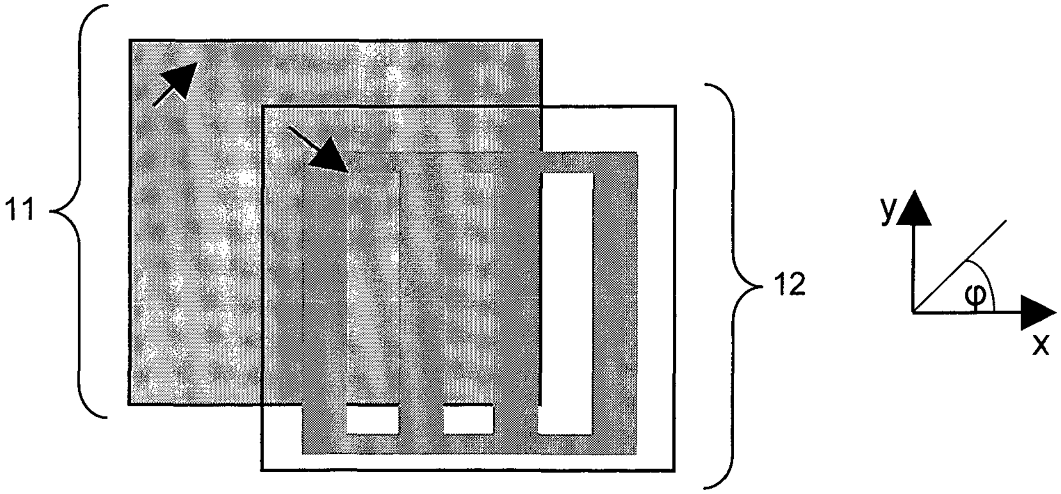
FIG. 18: Plan View of switchable imaging optic.
Figure 19:
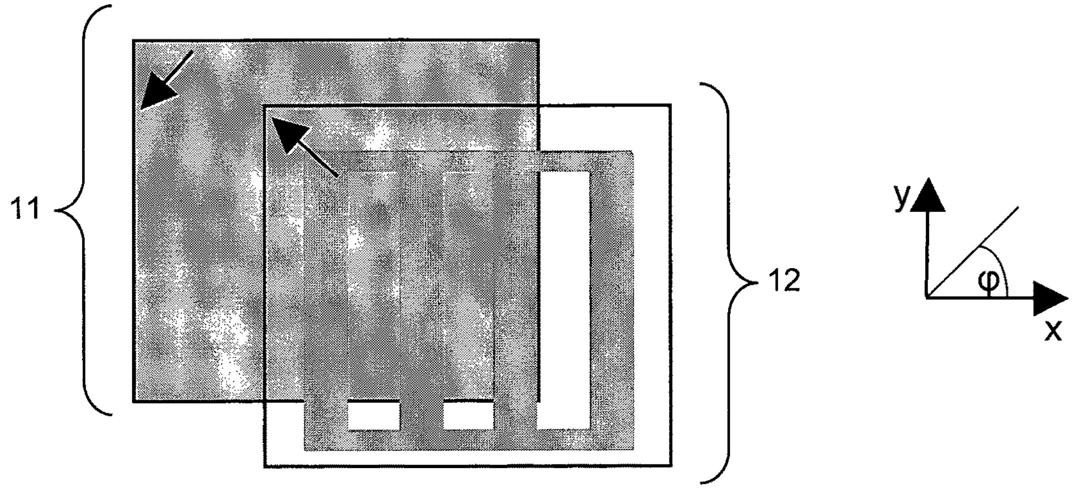
FIG. 19: Plan View of switchable imaging optic.

With reference to FIGS. 5*a* and 5*b*, there are an infinite number of ways that the first substrate 11 (alignment layer uppermost) and second substrate 12 (alignment layer lowermost) can be orientated so that the alignment layer rubbing directions (shown with arrows) of the first substrate 11 and the second substrate 12 can be orientated at 90° to each other. FIG. 17, FIG. 18 and FIG. 19 show a further 3 configurations that each have the rubbing direction of the first substrate 11 orientated at 90° to the second substrate 12 when assembled into a liquid crystal cell. The rubbing directions described for FIG. 17, FIG. 18 and FIG. 19 are in relation to the assembled switchable imaging optical device 1 when viewed from above. FIG. 17 shows a rubbing direction of $\phi_1$=0° on substrate 11 and a rubbing direction of $\phi_2$=270° on substrate 12. FIG. 18 shows a rubbing direction of $\phi_1$=45° on substrate 11 and a rubbing direction of $\phi_2$=315° on substrate 12. FIG. 19 shows a rubbing direction of $\phi_1$=225° on substrate 11 and a rubbing direction of $\phi_2$=135° on substrate 12. It is desirable that the polarisation state of light entering the switchable optical imaging device 1 is arranged to be linearly polarised and in a direction that is parallel to the rubbing direction on the first substrate encountered (i.e. substrate closest to the image display 4). The first substrate encountered by light from the image display 4 may be the first substrate 11 or the second substrate 12 of the switchable optical imaging device 1. A linear polariser 7 can be adhered to the outer face of the substrate 1 such that the transmission axis is perpendicular (crossed) to the transmission axis of light from the polarisation element 5. The rubbing conditions described by FIG. 18 were found to yield a switchable imaging optic device 1 with particularly good performance in terms of low optical 3D crosstalk, low switching voltage and fast 2D→3D switching and fast 3D→2D switching. The rubbing conditions described by FIG. 18 yield a molecular orientation of the liquid crystal molecules located in the centre of the liquid crystal layer (i.e. at d/2) that are parallel to the stripe electrodes 122. With zero potential difference applied across the liquid crystal layer, the rubbing conditions alone may define the handedness of the twisted structure. Alternatively, a chiral dopant can be added to the liquid crystal material that further cooperates with the rubbing conditions to define the handedness of the twisted structure. With reference to FIG. 18, a right handed chiral dopant should be used, for example, R811 (Merck), so that the right handed chiral dopant cooperates with the rubbing conditions. The rubbing conditions described by FIG. 18 enable the switchable imaging optic device 1 to be switched to a 3D mode with low 3D crosstalk using Drive Scheme 1 (DS1) as described by FIG. 8 with V1 typically between 2V and 15V with a preferred value of around 2-5V. The use of Drive Scheme 1 (DS1) to achieve low crosstalk performance is preferable to the use of Drive Scheme 2 (DS2).

With reference to FIGS. 5*a* and 5*b*, there are an infinite number of ways that the first substrate 11 (alignment layer uppermost) and second substrate 12 (alignment layer lowermost) can be rubbed and orientated so that the alignment layer rubbing directions (shown with arrows) of the first substrate 11 and the second substrate 12 can be orientated at an angle of 90° to each other. Moreover, although FIG. 5*a* shows the alignment layer rubbing directions of the first substrate 11 and the second substrate 12 orientated at an angle of 90° to each other, the invention is not limited to this and the alignment layer rubbing directions of the first substrate 11 and the second substrate 12 may be orientated at an angle of less than 90° to each other. There are an infinite number of ways that the first substrate 11 (alignment layer uppermost) and second substrate 12 (alignment layer lowermost) can be rubbed and orientated so that the alignment layer rubbing directions of the first substrate 11 and the second substrate 12 can be orientated at an angle of less than 90° to each other. The use of a rubbing angle between the first substrate 11 (alignment layer uppermost) and second substrate 12 (alignment layer lowermost) of less than 90°, for example, 85° or 80°, will bias the handedness of the liquid crystal twist. If the rubbing angle between the first substrate 11 and second substrate of less than 90° is used, it is preferable to ensure that any liquid crystal pretilt and/or any liquid crystal chiral dopant co-operates with the biased handedness provided by the liquid crystal twist angle. The use of rubbing angles to enable the liquid crystal twist angle to be in the range 80°<φ<90° may help to prevent the formation of unwanted liquid crystal structures. The orientation of linearly polarised light incident on the LC layer 2 is preferably arranged to be aligned substantially parallel to the rubbing direction on the lowermost substrate 11 while the orientation of the transmission axis of the exit polariser 7 is preferably arranged to be orientated substantially parallel to the rubbing direction on the uppermost substrate 12.

Figure 21A:
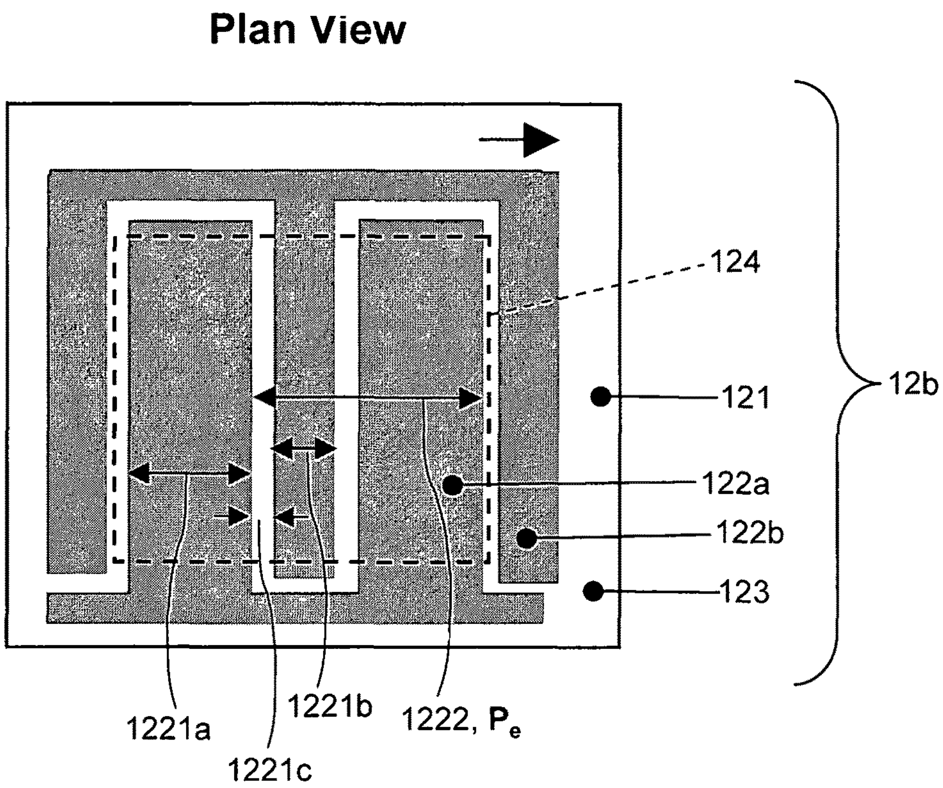
FIG. 21*a*: Plan View of second substrate of switchable imaging optic.
Figure 21B:
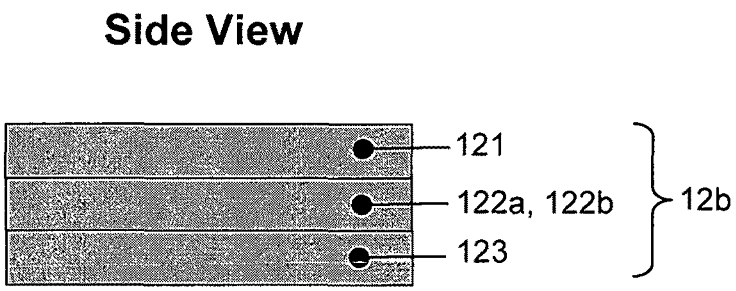
FIG. 21*b*: Side View of second substrate of switchable imaging optic.
Figure 22A:
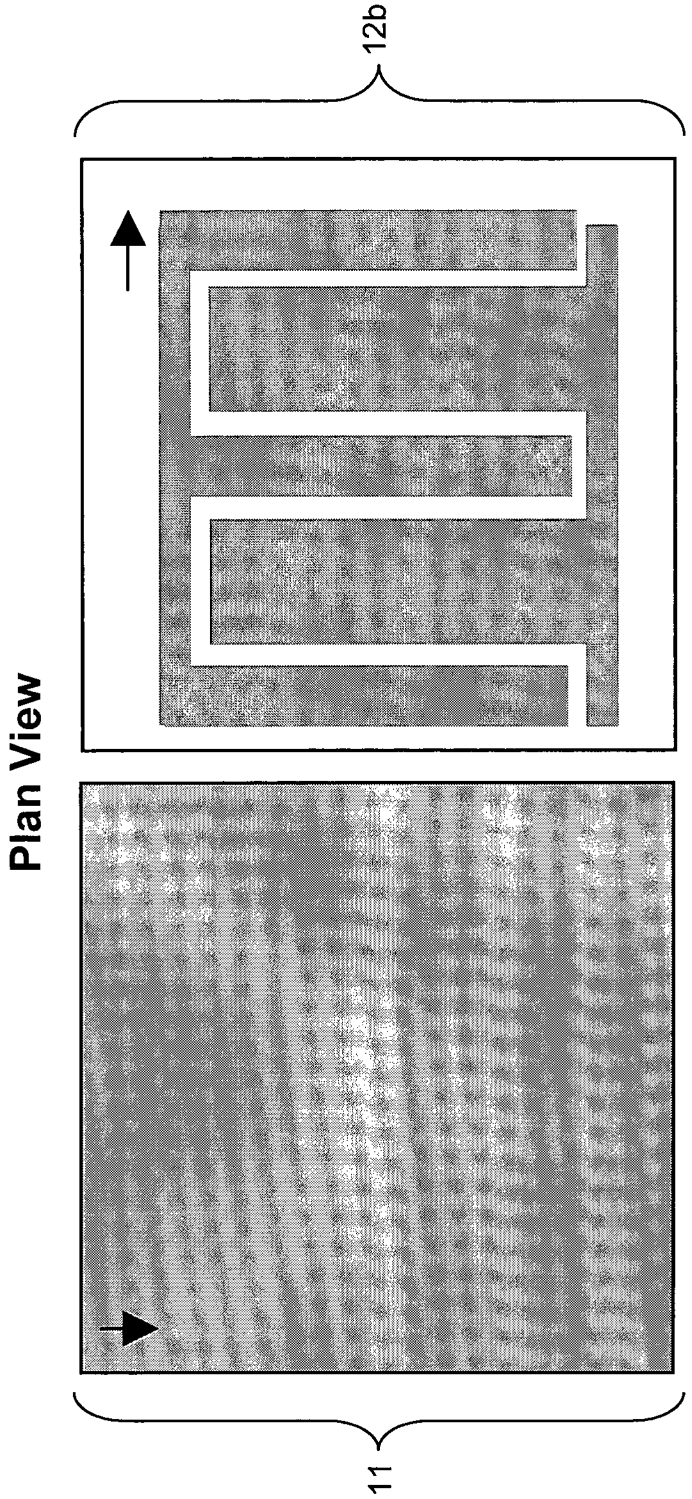
FIG. 22*a*: Plan View of switchable imaging optic.
Figure 22B:
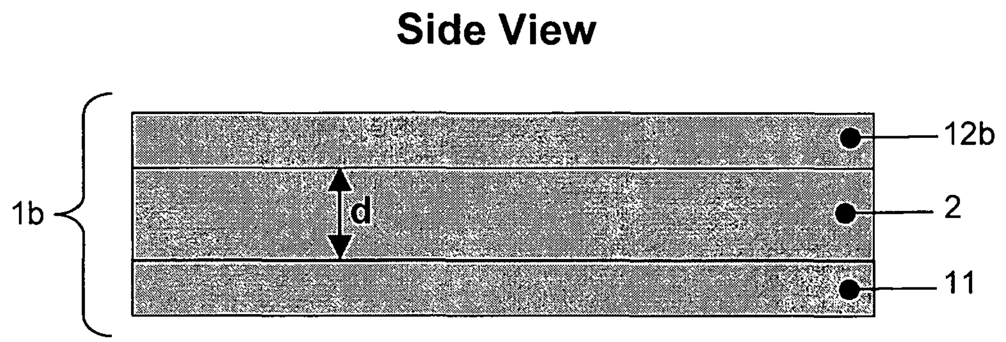
FIG. 22*b*: Side View of switchable imaging optic.
Figure 23:
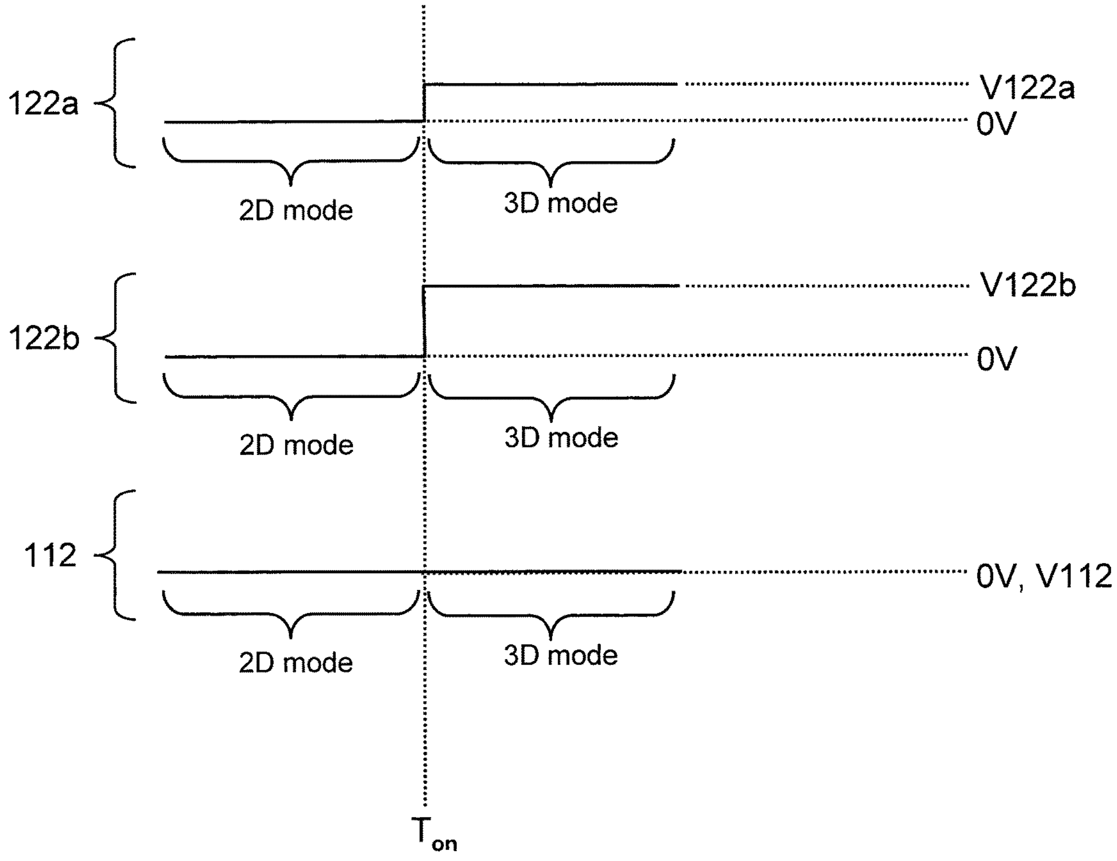
FIG. 23: Switchable imaging optic drive scheme.

With reference to FIGS. 3*a* and 3*b*, FIGS. 21*a* and 21*b* and FIGS. 22*a* and 22*b*, fabrication of a switchable imaging optical device 1*b* according to another embodiment of the invention will now be described. The switchable imaging optical device 1*b* is comprised of a first substrate 11, as described previously and shown in FIGS. 3*a* and 3*b*, and a second substrate 12*b*, as shown in FIGS. 21*a* and 21*b*. The second substrate 12*b* is comprised of a first electrode 122*a* of width 1221*a* and a second electrode 122*b* of width 1221*b*. The first electrode 122*a* and the second electrode 122*b* are interdigitated and electrically distinct from each other. The dashed line 124 in FIG. 21*a* shows the approximate spatial extent of the pixelated area of the image display 4. As a general rule, setting the width of the second electrode 1221*b* to be commensurate with the liquid crystal layer 2 thickness, d, was found to produce good 3D performance and provided a basis for subsequent optimisation. As a general rule, the gap 1221*c* between the first electrode 122*a* and the second electrode 122*b* within the region 124 is arranged to be commensurate with the thickness, d, of the liquid crystal layer 2 and provided a basis for subsequent optimisation. All other features of substrate 12*b* (alignment layer, rubbing conditions etc.) are identical to the second substrate 12 as shown in FIGS. 4*a* and 4*b*, the details of which, have been described previously. The subsequent construction of the switchable imaging optical device 1*b* is shown in FIG. 22. The first substrate 11 (alignment layer 113 uppermost) and second substrate 12*b* (alignment layer 123 uppermost) are spaced a predetermined distance, d, apart, with alignment layers facing each other and glued such that the respective rubbing directions are orientated at 90° to each other, in accordance to the fabrication procedure described previously. A liquid crystal material is then injected into the resulting cell and the switchable imaging optical device 1*b* is adhered to an image display 4 to yield a switchable 2D-3D display systems 8*a* and 8*b*, as shown in FIG. 6 or FIG. 7 respectively and in accordance to the fabrication procedure described previously. With reference to FIG. 23, switching between the 2D mode and 3D mode will now be described. At time $T_{on}$, the switchable optical imaging device 1*b* is turned from a non-imaging state (2D mode) to an imaging state (3D mode). At time $T_{on}$, voltage V122*a* is applied to electrode 122*a* and voltage V122*b* is applied to electrode 122*b* and voltage V112 is applied to electrode 112. The potential difference between electrode 122*a* (substrate 12*b*) and electrode 112 (substrate 11) is set to be below the switching threshold ($V_{TH}$) of the liquid crystal. The switching threshold is typically between 1 and 2 volts. The potential difference between electrode 122*a* (substrate 12*b*) and electrode 112 (substrate 11) may be set to zero volts. Alternatively, the voltage on electrode 122*a* may not be set but allowed to have a floating value. The potential difference between electrode 122*b* (substrate 12*b*) and electrode 112 (substrate 11) can be in tuned in the range 2V to 40V to optimise performance, with a preferred value of around 5V. With reference to FIG. 23, the imaging function of the switchable optical imaging device 1*b* can for example be activated by applying 800 mV to electrode 122*a,* 5V to electrode 122*b* and 0V to electrode 112. As according to standard liquid crystal drive schemes, changing the polarity of the applied voltages, at a frequency of between 25 Hz and 1000 Hz, while maintaining the magnitude of the applied voltage is advantageous in order to prevent image sticking. If a voltage of alternating polarity is applied to the electrode 122*a* and electrode 122*b* then it may be advantageous that the voltages applied to 122*a* and electrode 122*b* are in phase.

The device of FIGS. 21*a* and 21*b* again is selectively operable in a first, imaging mode in which the device comprises at least one region that performs a lensing action and at least one region that at least partially attenuates light passing through the or each second region—and preferably comprises a plurality of regions that perform a lensing action and a plurality of regions that at least partially attenuates light so as to define a parallax barrier. For the drive scheme of FIG. 23, the light-attenuating regions are defined under the thin electrodes 122*b* and the apexes of the GRIN lens are under the wide electrodes 122*a*. As with the embodiment of FIGS. 5*a* and 5*b*, whether or not the edges of adjacent GRIN lenses meet one another depends on the width of the thin electrodes 122*b*.

Figure 24A:
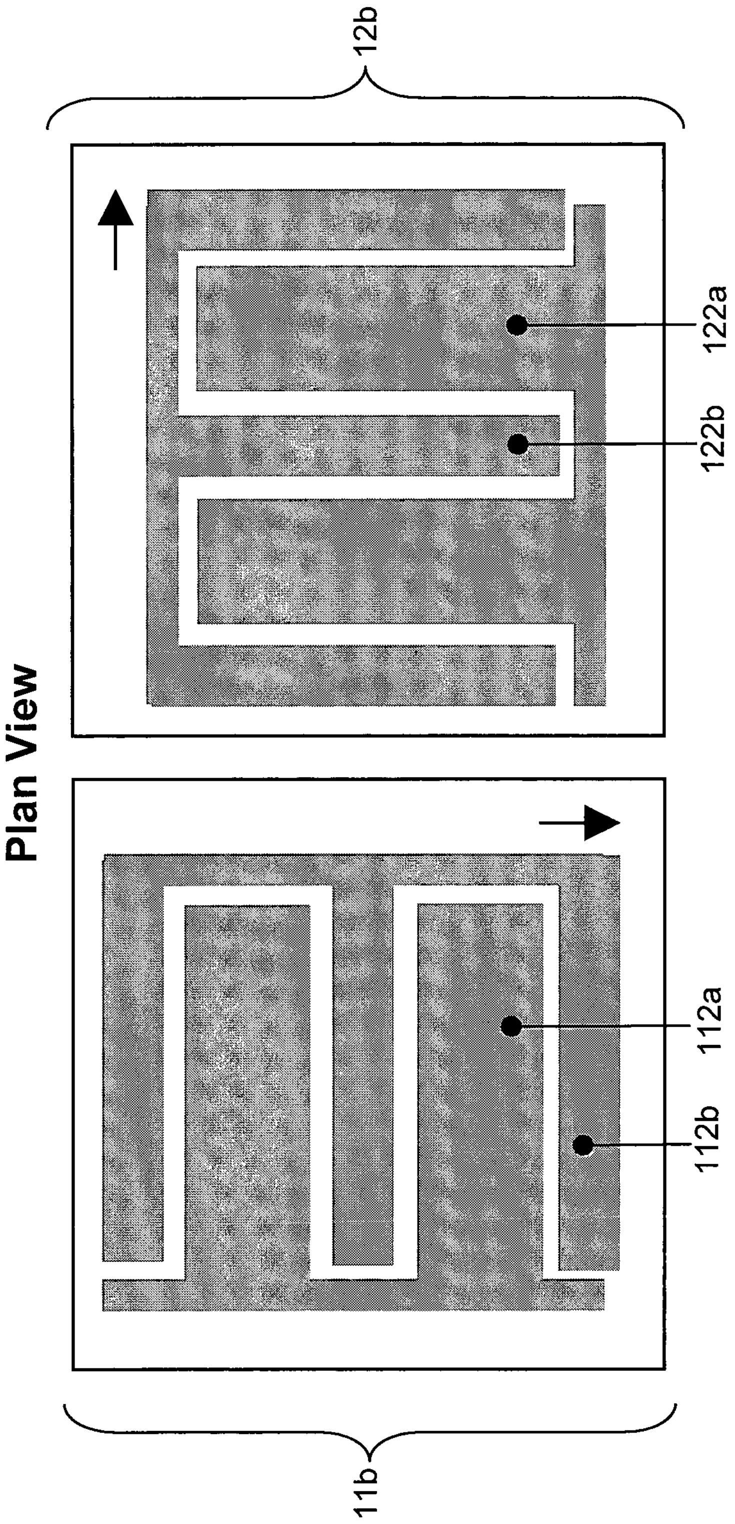
FIG. 24*a*: Plan View of switchable imaging optic.
Figure 24B:
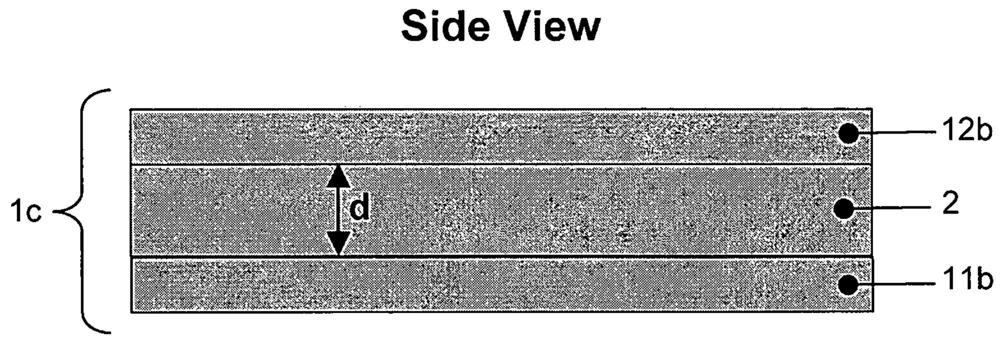
FIG. 24*b*: Side View of switchable imaging optic.
Figure 25A:
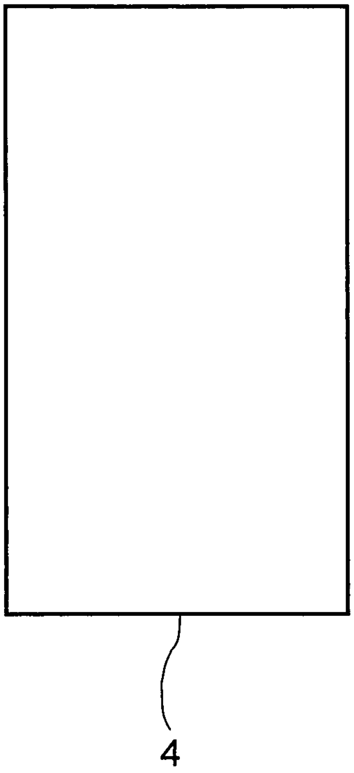
FIG. 25*a*: An image display in a portrait (vertical) orientation.
Figure 25B:
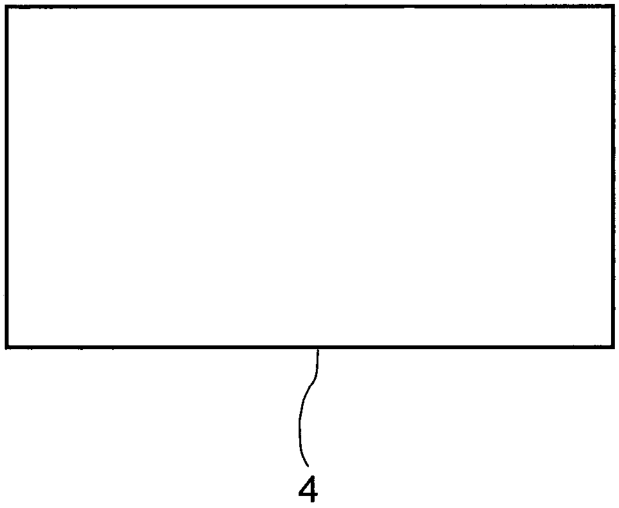
FIG. 25*b*: An image display in a landscape (horizontal) orientation.
Figure 26A:
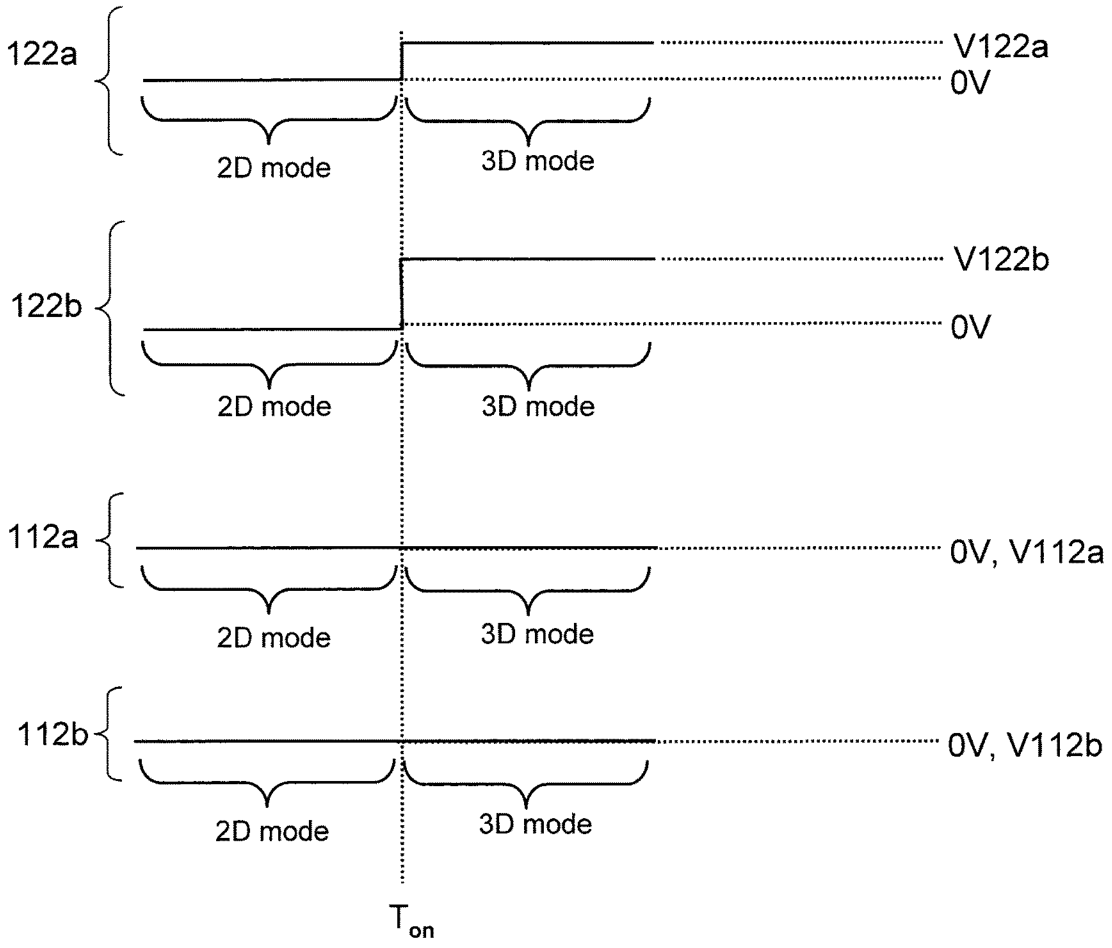
FIG. 26*a*: Switchable imaging optic drive scheme for a first orientation.
Figure 26B:
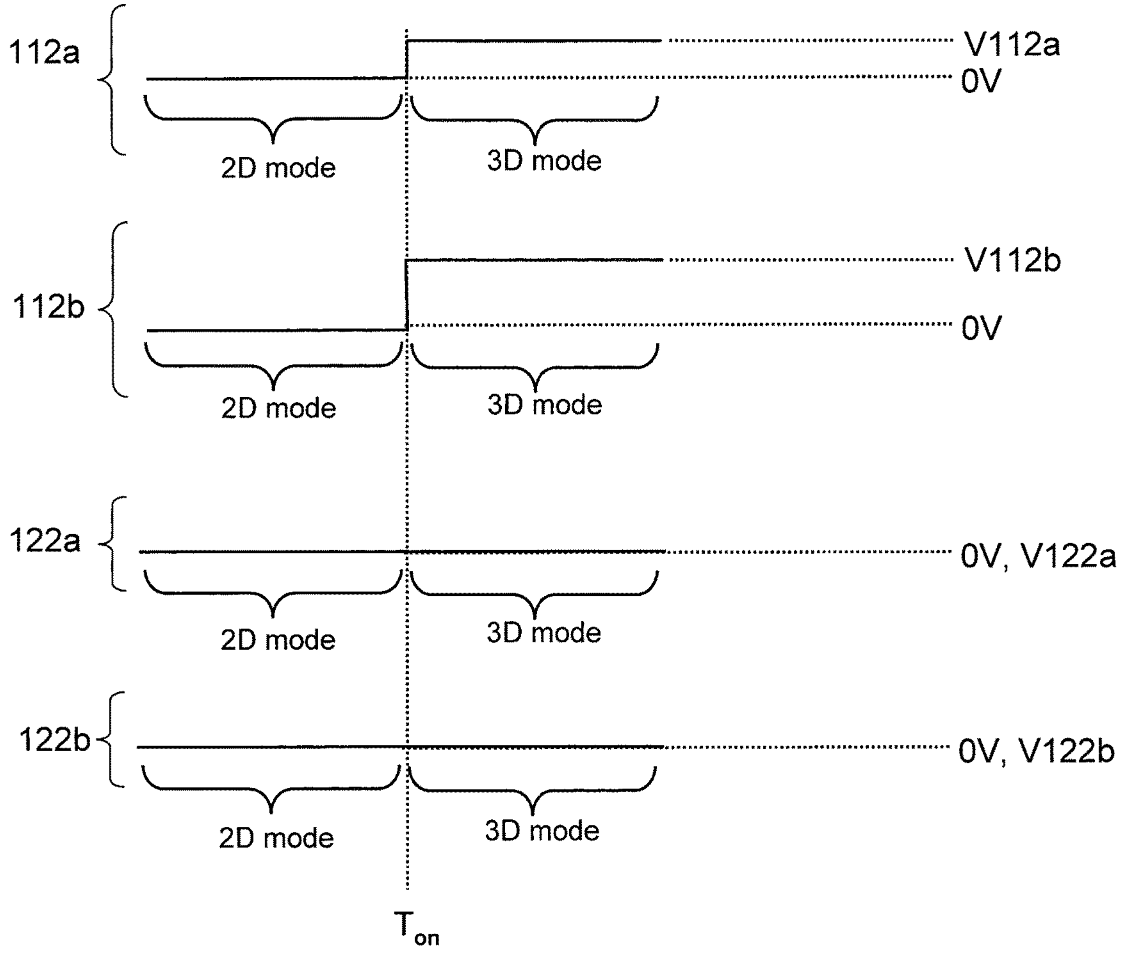
FIG. 26*b*: Switchable imaging optic drive scheme for a second orientation.

With reference to FIGS. 21*a* and 21*b*, FIGS. 24*a* and 24*b*, FIGS. 25*a* and 25*b* and FIGS. 26*a* and 26*b* fabrication of a switchable imaging optical device 1*c* according to another embodiment of the invention will now be described. The switchable imaging optical device 1*c* is selectively operable in a first imaging mode in which it predominantly performs a lensing and parallax barrier action in a first orientation and in a second imaging mode in which it predominantly performs a lensing and parallax barrier action in a second orientation as well as in a mode that performs no imaging or substantially no imaging for any orientation. The first orientation and second orientation can be arranged to be orthogonal to each other. Consequently, a switchable 2D-3D display system can be realised whereby the display system is switchable between a 2D mode, a first 3D mode and a second 3D mode. In the first 3D mode, 3D images are viewed when the image display 4 is in a portrait (vertical) orientation, see FIG. 25*a*. In the second 3D mode, 3D images are viewed when the image display 4 is in a landscape (horizontal) orientation, see FIG. 25*b*. With reference to FIGS. 21*a* and 21*b*, fabrication of the substrate 12*b* pertaining to the switchable imaging optical device 1*c* has been described previously. With reference to FIGS. 24*a* and 24*b*, the details of the substrate 11*b* (electrode arrangement, alignment layer, rubbing direction) are the same as substrate 12*b*. With reference to FIGS. 24*a* and 24*b*, the formation of a switchable imaging optical device 1*c* from substrate 11*b* (alignment layer uppermost) and substrate 12*b* (alignment layer uppermost) are shown and adhere to the same fabrication procedure as described previously. The subsequent integration of optical switchable imaging optical device 1*c* with an image display 4 to form a switchable 2D-3D display system (8*a* and 8*b*) is realised using the fabrication procedure as described previously. With reference to FIGS. 26*a* and 26*b*, switching between the 2D mode and 3D mode will now be described. At time $T_{on}$, the switchable optical imaging device 1*c* is turned from a non-imaging state (2D mode) to an imaging state (3D mode). Switching between a 2D mode and 3D mode of a first orientation (for example, portrait 3D mode) is illustrated by the driving scheme in FIG. 26*a*. At time $T_{on}$, voltage V122*a* is applied to electrode 122*a* and voltage V122*b* is applied to electrode 122*b* and voltage V112*a* is applied to electrode 112*a* and voltage V112*b* is applied to electrode 112*b*. The potential difference between electrodes 112*a* and 112*b* is zero volts (so that the electrodes 112$a$ and 112$b$ form a pseudo-planar electrode—that is, the electrodes 112$a$ and 112$b$ together effectively act as a single electrode that extends over the entire active area of the device). The potential difference between electrode 122$a$ (substrate 12$b$) and electrodes 112$a$ and 112$b$ (substrate 11$b$) is set to be below the switching threshold ($V_{TH}$) of the liquid crystal. The switching threshold is typically between 1 and 2 volts and so a potential difference between electrode 122$a$ (substrate 12$b$) and electrodes 112$a$ and 112$b$ (substrate 11$b$) of around 800 mV was found to give good performance. The potential difference between electrode 122$b$ (substrate 12$b$) and electrodes 112$a$ and 112$b$ (substrate 11$b$) can be in tuned in the range 3V to 40V to optimise performance, with a preferred value of around 5V. With reference to FIG. 26$a$, the imaging function of the switchable optical imaging device 1$c$ can therefore be activated by applying 800 mV to electrode 122$a$, 5V to electrode 122$b$ and 0V to electrode 112$a$ and 0V to electrode 112$b$. As according to standard liquid crystal drive schemes, changing the polarity of the applied voltages (between 25 Hz and 1000 Hz) while maintaining the magnitude of the applied voltage is advantageous in order to prevent image sticking. If a voltage of alternating polarity is applied to the electrode 122$a$ and electrode 122$b$ for a 3D mode in the Portrait orientation, then it may be advantageous that the voltages applied to 122$a$ and electrode 122$b$ are in phase. This concludes the switching between a 2D mode and 3D mode of a first orientation (for example, portrait 3D mode) as illustrated by the driving scheme in FIG. 26$a$. Switching between a 2D mode and 3D mode of a second orientation (for example, landscape 3D mode) is illustrated by the driving scheme in FIG. 26$b$. At time $T_{on}$, voltage V122$a$ is applied to electrode 122$a$ and voltage V122$b$ is applied to electrode 122$b$ and voltage V112$a$ is applied to electrode 112$a$ and voltage V112$b$ is applied to electrode 112$b$. The potential difference between electrode 122$a$ and electrode 122$b$ is zero volts (so that the electrodes 122$a$ and 122$b$ form a pseudo-planar electrode—that is, they together effectively act as a single electrode that extends over the entire active area of the device). The potential difference between electrode 112$a$ (substrate 11$b$) and electrodes 122$a$ and 122$b$ (substrate 12$b$) is set to be below the switching threshold ($V_{TH}$) of the liquid crystal. The switching threshold is typically between 1 and 2 volts and so a potential difference between electrode 112$a$ (substrate 11$b$) and electrodes 122$a$ and 122$b$ (substrate 12$b$) of around 800 mV was found to give good performance. The potential difference between electrode 112$b$ (substrate 11$b$) and electrodes 122$a$ and 122$b$ (substrate 12$b$) can be in tuned in the range 3V to 40V to optimise performance, with a preferred value of around 5V. With reference to FIG. 26$b$, the imaging function of the switchable optical imaging device 1$c$ can therefore be activated by applying 800 mV to electrode 112$a$, 5V to electrode 112$b$, 0V to electrode 122$a$ and 0V to electrode 122$b$. As according to standard liquid crystal drive schemes, changing the polarity of the applied voltages (between 25 Hz and 1000 Hz) while maintaining the magnitude of the applied voltage is advantageous in order to prevent image sticking. If a voltage of alternating polarity is applied to the electrode 112$a$ and electrode 112$b$ for a 3D mode in the Landscape orientation, then it may be advantageous that the voltages applied to 112$a$ and electrode 112$b$ are in phase. This concludes the switching between a 2D mode and 3D mode of a second orientation (for example, landscape 3D mode) as illustrated by the driving scheme in FIG. 26$b$.

Alternatively, the switchable imaging optical device 1$c$ as described previously may also be realised by using an uppermost substrate as illustrated in FIGS. 4$a$ and 4$b$ and low-most substrate as illustrated in FIGS. 4$a$ and 4$b$. Either Driving Scheme 1 (DS1) or Driving Scheme 2 (DS2) may be employed to yield an imaging mode in a first orientation (for example, portrait orientation) and an imaging mode in a second orientation (for example, landscape orientation).

Figure 27A:
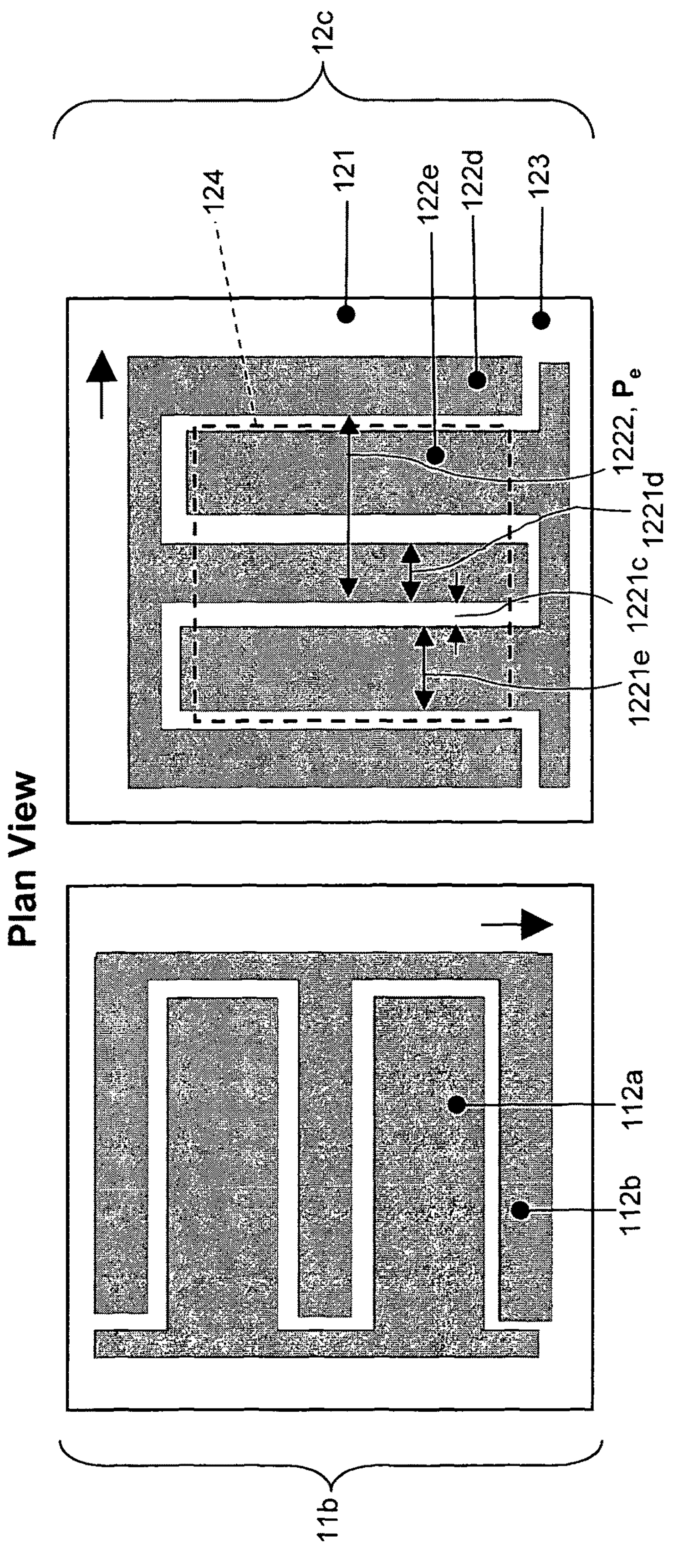
FIG. 27*a*: Plan View of switchable imaging optic.
Figure 27B:
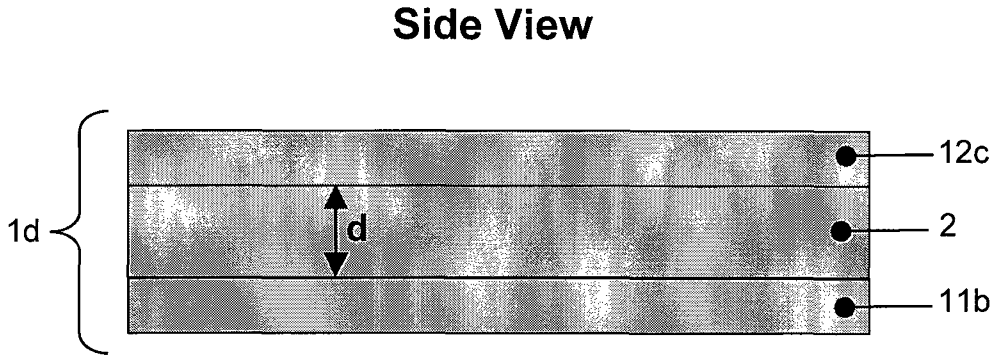
FIG. 27*b*: Side View of switchable imaging optic.
Figure 28A:
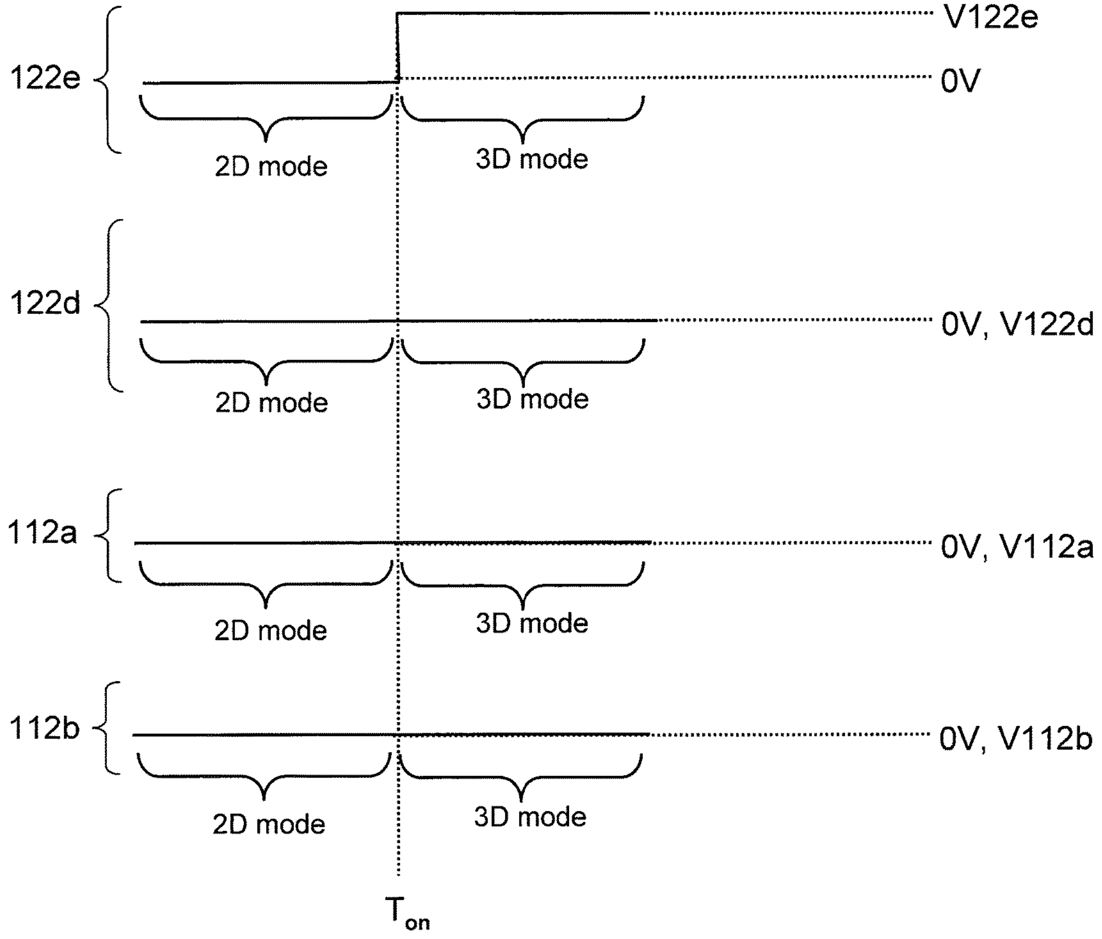
FIG. 28*a*: Switchable imaging optic drive scheme for a first orientation.
Figure 28B:
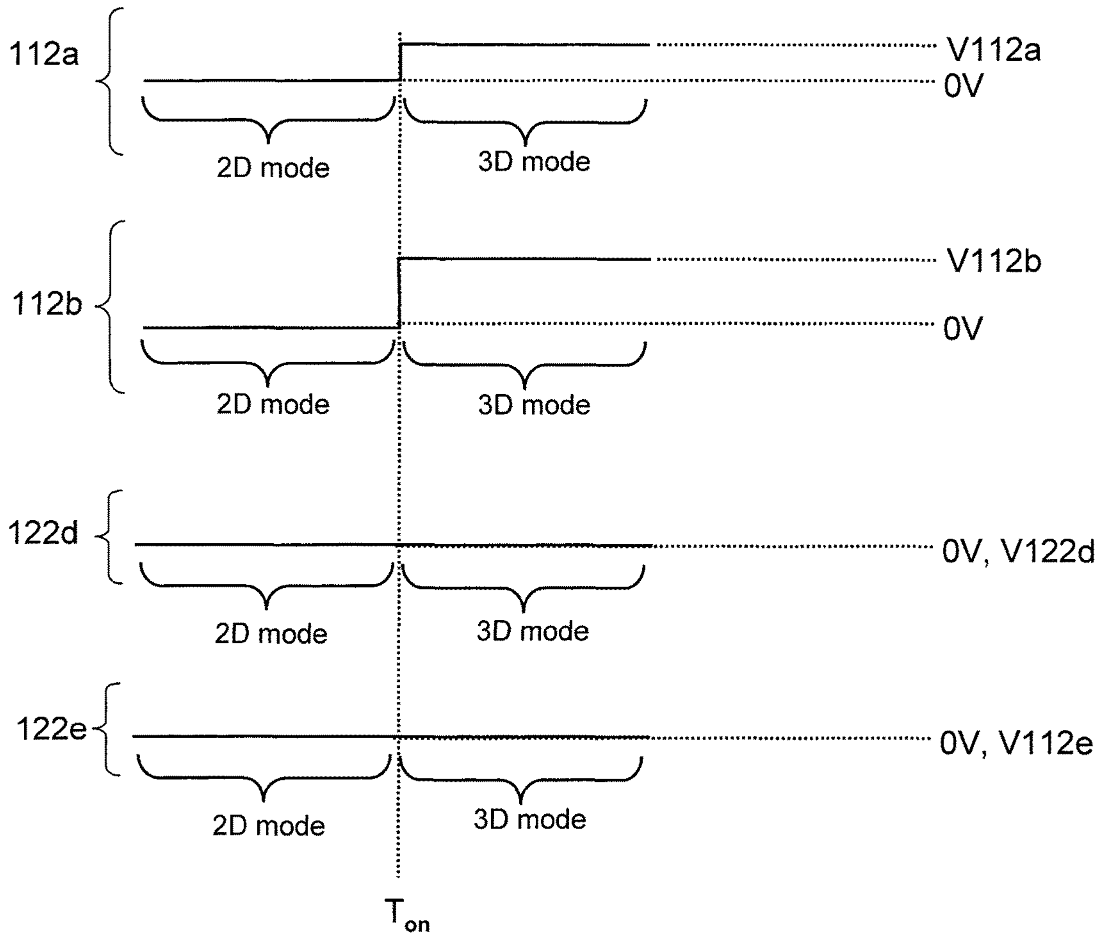
FIG. 28*b*: Switchable imaging optic drive scheme for a second orientation.

With reference to FIGS. 21$a$ and 21$b$, FIGS. 25$a$ and 25$b$, FIGS. 27$a$ and 27$b$ and FIGS. 28$a$ and 28$b$, fabrication of a switchable imaging optical device 1$d$ according to another embodiment of the invention will now be described. The switchable imaging optical device 1$d$ is selectively operable in a first imaging mode in which it predominantly performs a parallax barrier action in a first orientation and a second imaging mode in which it predominantly performs a lensing action and a parallax barrier action in a second orientation as well as in a mode that performs no imaging or substantially no imaging for any orientation. The first orientation and second orientation can be arranged to be orthogonal to each other. Consequently, a switchable 2D-3D display system can be realised whereby the display system is switchable between a 2D mode, a first 3D mode and a second 3D mode. In the first 3D mode, 3D images are viewed when the image display 4 is in a portrait (vertical) orientation. In the second 3D mode, 3D images are viewed when the image display 4 is in a landscape (horizontal) orientation. If the 3D mode for the landscape (horizontal) orientation is achieved when the switchable imaging optical device 1$d$ predominantly performs a parallax barrier action, then the 3D mode for the portrait (vertical) orientation is achieved when the switchable imaging optical device 1$d$ predominantly performs a lensing action. If the 3D mode for the landscape (horizontal) orientation is achieved when the switchable imaging optical device 1$d$ predominantly performs a lensing action, then the 3D mode for the portrait (vertical) orientation is achieved when the switchable imaging optical device 1$d$ predominantly performs a parallax barrier action. If the image display 4 is comprised of a standard arrangement of colored sub-pixels such that in the portrait (vertical) orientation any given row of sub-pixels proceeds cyclically through red, green, blue, red etc. and given column of sub-pixels are of a single colour, then it is preferable that the switchable imaging optical device 1$d$ predominantly performs a parallax barrier action in order to yield a 3D mode in the portrait (vertical) orientation since colour artefacts are minimised. With reference to FIGS. 21$a$ and 21$b$, fabrication of the substrate 11$b$ pertaining to the switchable imaging optical device 1$d$ that predominantly performs a lensing action has been described previously, substrate 11$b$ is essentially the same as substrate 12$b$. With reference to FIGS. 27$a$ and 27$b$, fabrication of the substrate 12$c$ pertaining to the switchable imaging optical device 1$d$ that predominantly performs a parallax barrier action is comprised of a first electrode 122$d$ of width 1221$d$ and a second electrode 122$e$ of width 1221$e$. The electrode 122$d$ and 122$e$ are interdigitated and distinct. The ratio of electrode width 122$e$ to 122$d$ (i.e. 1221$e$/1221$d$) is typically within the range 1 to 3. The gap 1221$c$ between the electrodes 122$d$ and 122$e$ is subject to the same design constraints as discussed previously. With reference to FIGS. 27$a$ and 27$b$, the formation of a switchable imaging optical device 1$d$ from substrate 11$b$ (alignment layer uppermost) and substrate 12$c$ (alignment layer uppermost) are shown and adhere to the same fabrication procedure as described previously. The subsequent integration of optical switchable imaging optical device 1$d$ with an image display 4 to form a switchable 2D-3D display system (8$a$ and 8$b$) is realised using the fabrication procedure as described previously. With reference to FIGS. 28$a$ and 28$b$, switching between the 2D mode and 3D mode will now be described. At time $T_{on}$, the switchable optical imaging device 1*d* is turned from a non-imaging state (2D mode) to an imaging state (3D mode). Switching between a 2D mode and 3D mode of a first orientation (for example, portrait 3D mode) is illustrated by the driving scheme in FIG. 28*a*. At time $T_{on}$, voltage V122*d* is applied to electrode 122*d* and voltage V122*e* is applied to electrode 122*e* and voltage V112*a* is applied to electrode 112*a* and voltage V112*b* is applied to electrode 112*b*. The potential difference between electrode 112*a* and electrode 112*b* is zero volts. The potential difference between electrode 122*d* and electrode 112*a* (and electrode 112*b*) is zero volts. The potential difference between electrode 122*e* and electrodes 112*a* and 112*b* is within the range 2V to 40V. With reference to FIG. 28*a*, the imaging function of the switchable optical imaging device 1*d* can therefore be activated by applying, for example, 20V to electrode 122*e,* 0V to electrode 122*d,* 0V to electrode 112*a* and 0V to electrode 112*b*. As according to standard liquid crystal drive schemes, changing the polarity of the applied voltages (between 25 Hz and 1000 Hz) while maintaining the magnitude of the applied voltage is advantageous in order to prevent image sticking. This concludes the switching between a 2D mode and 3D mode of a first orientation (for example, portrait 3D mode) as illustrated by the driving scheme in FIG. 28*a*. Switching between a 2D mode and 3D mode of a second orientation (for example, landscape 3D mode) is illustrated by the driving scheme in FIG. 28*b*. At time $T_{on}$, voltage V112*a* is applied to electrode 112*a* and voltage V112*b* is applied to electrode 112*b* and voltage V122*d* is applied to electrode 122*d* and voltage V122*e* is applied to electrode 122*e*. The potential difference between electrode 122*d* and 122*e* is zero volts. The potential difference between electrode 112*a* and electrodes 122*d* and 122*c* (substrate 12*c*) is set to be below the switching threshold ($V_{TH}$) of the liquid crystal. The switching threshold is typically between 1 and 2 volts. The potential difference between electrode 112*a* (substrate 11*b*) and electrodes 122*d* and 122*e* (substrate 12*c*) may be set to zero volts. Alternatively, the voltage on electrode 122*a* may not be set but allowed to have a floating value. The potential difference between electrode 112*b* (substrate 11*b*) and electrodes 122*d* and 122*e* (substrate 12*c*) can be tuned in the range 2V to 40V to optimise performance, with a preferred value of around 5V. With reference to FIG. 28*b*, the imaging function of the switchable optical imaging device 1*d* can for example be activated by applying 800 mV to electrode 112*a,* 5V to electrode 112*b,* 0V to electrode 122*d* and 0V to electrode 122*e*. As according to standard liquid crystal drive schemes, changing the polarity of the applied voltages (between 25 Hz and 1000 Hz) while maintaining the magnitude of the applied voltage is advantageous in order to prevent image sticking. This concludes the switching between a 2D mode and 3D mode of a second orientation (for example, landscape 3D mode) as illustrated by the driving scheme in FIG. 28*b*.

Figure 20A:
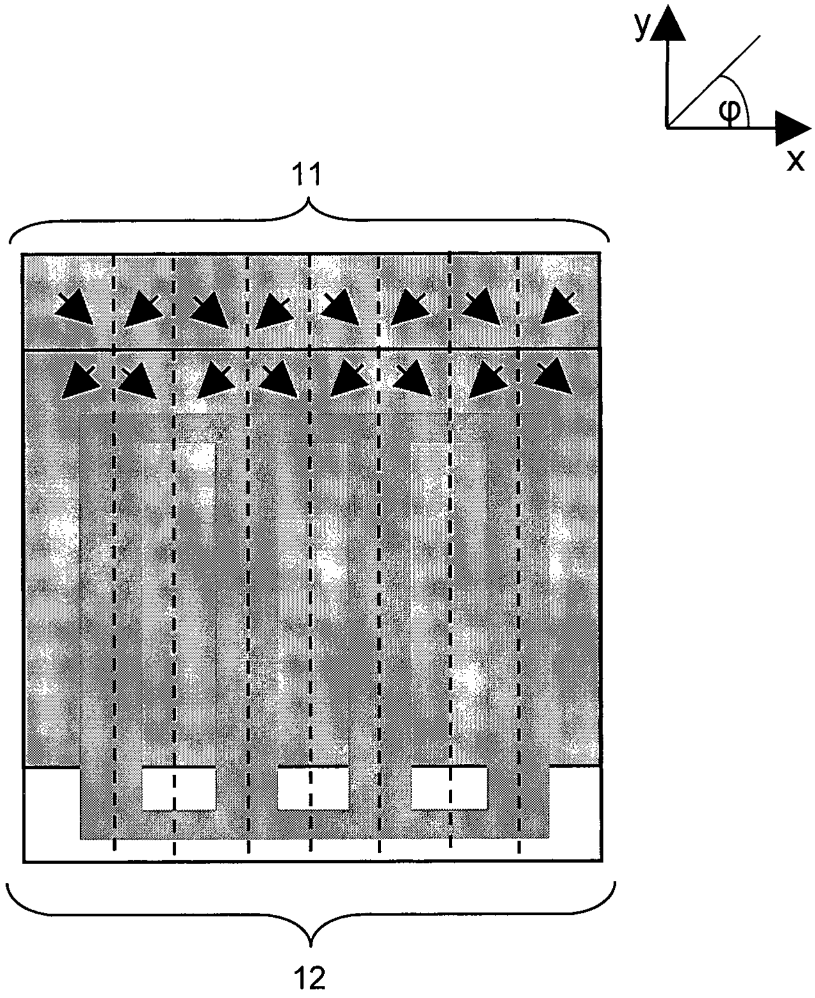
FIG. 20*a*: Plan View 1 of switchable imaging optic.
Figure 20B:
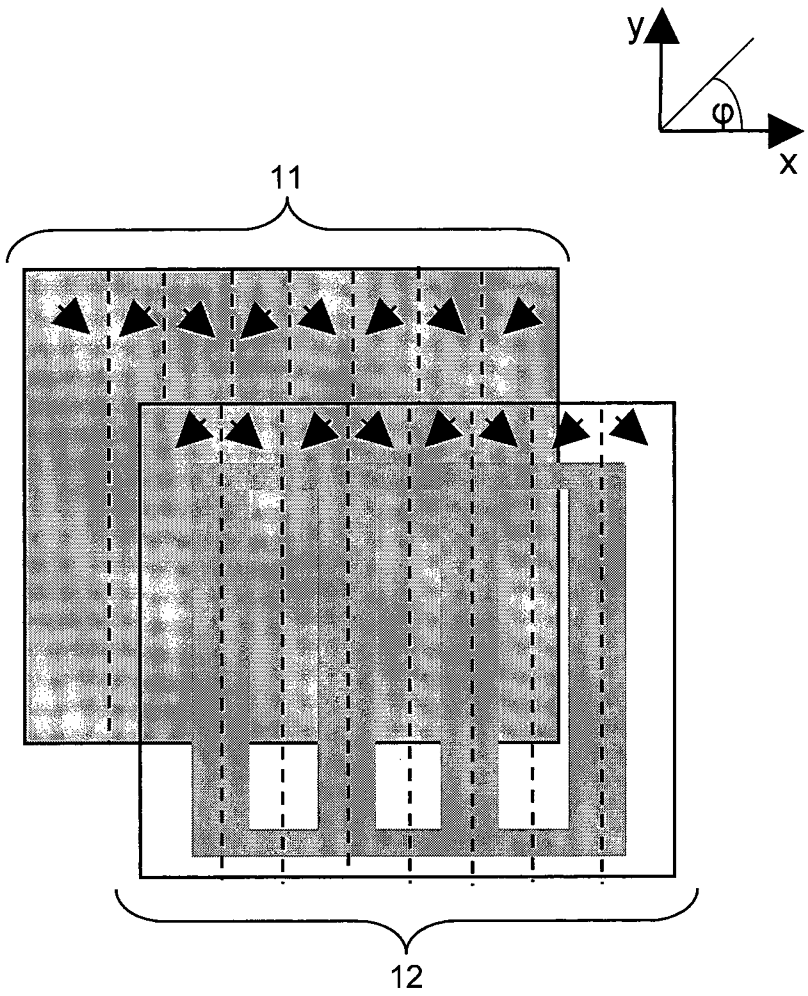
FIG. 20*b*: Plan View 2 of switchable imaging optic.

With reference to FIG. 9, it is desirable that the liquid crystal nucleation time T1 be as short as possible to facilitate fast switching between the non-imaging function and the imaging function of the switchable imaging optical device 1. With reference to FIG. 9, it is also desirable that the nucleation voltage V2 is as low as possible. Various nucleation schemes have been previous described in the literature and so will only be described here briefly. The nucleation time T1 and voltage V2 may be optimised via the use of patterned surface alignment on the layers 113 and 123. A first example; layer 113 and/or layer 123 may be patterned to induce both planar liquid crystal alignment (low liquid crystal pretilt) and vertical liquid crystal alignment (high liquid crystal pretilt)—this is known as patterned zenithal alignment. A second example; layer 113 and/or layer 123 may be patterned to induce patterned planar alignment for at least 2 different directions (i.e. patterned azimuth alignment). A specific example of patterned azimuth alignment is shown in FIG. 20*a* (plan view 1) and FIG. 20*b* (plan view 2), where the surface alignment of the first substrate 11 (alignment layer uppermost) and the second substrate 12 (alignment layer lowermost) have been patterned, the pitch of the patterning equal to half the electrode pitch on substrate 12 (as denoted by the dashed line). The two patterned rubbing directions on the first substrate 11 are at ($\phi_{11}$=315° and $\phi_{12}$=225°. The two patterned rubbing directions on the second substrate 12 are at $\phi_{21}$=225° and $\phi_{22}$=315°. The lateral alignment of the first substrate 11 and second substrate 12 is also shown in FIG. 20, such that $\phi_{11}$=315° and $\phi_{21}$=225° form a first liquid crystal alignment region and $\phi_{12}$=225° and $\phi_{22}$=315° form a second liquid crystal alignment region. It may be desirable not to add a chiral dopant to the liquid crystal material when a patterned surface alignment treatment is undertaken.

With reference to FIG. 9, nucleation time T1 and voltage V2 may be optimized via patterning the thickness of the liquid crystal layer 2. Nucleation time T1 and voltage V2 may be optimized via the use polymer networks. For example, a reactive mesogen (RM 84, Merck) is added to the liquid crystal 2 at a low concentration (~1%-5%). Liquid crystal nucleation is undertaken for T1 at V2. After the initial nucleation period T1, the liquid crystal and reactive mesogen mixture are exposed to UV light and a polymer network is formed within the liquid crystal layer. Subsequent nucleation is then achieved at a reduced value or T1 and/or V2.

Another method of reducing T1 and V2 is by choosing an liquid crystal material with a higher $\Delta\epsilon$ and by minimising the thickness of the liquid crystal layer, d.

With reference to FIG. 6 and FIG. 7, the embodiments thus far described pertain to a 2-View display system. In a 2-View display system, 2 different images are imaged by an optical device to towards the user who is situated in the optical far field. In general, the switchable imaging optical device 1 described in the preceding embodiments can be designed to operate for multi-view display system where n images are imaged towards the user who is situated in the optical far field.

Figure 31A:
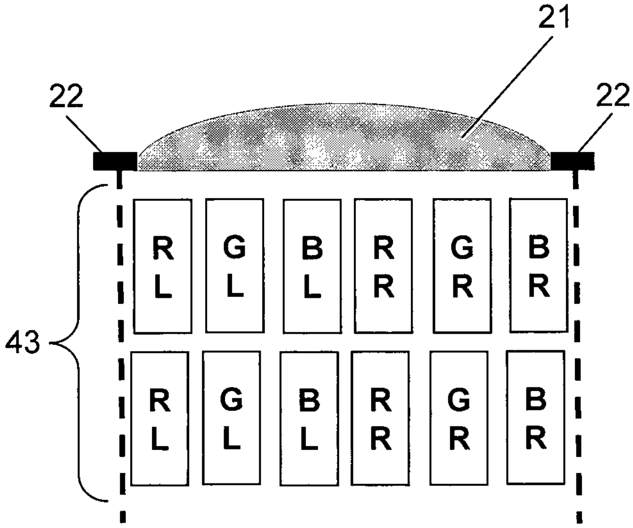
FIG. 31*a*: Multi-view display using non-oblique switchable imaging optical element and addressing of sub-pixels thereof.
Figure 31B:
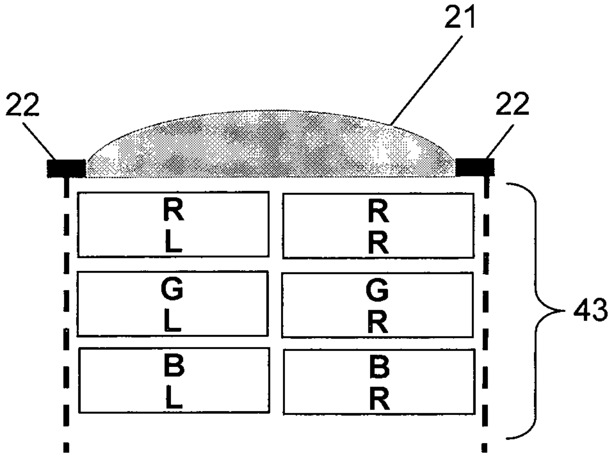
FIG. 31*b*: Multi-view display using non-oblique switchable imaging optical element and addressing of sub-pixels thereof.

With reference to FIG. 6, FIG. 7, FIG. 25*a*, FIG. 25*a*, the embodiments thus far described pertain to a switchable imaging optical device 1 comprised of lens 21 and parallax barrier 22 components whereby the lens 21 and parallax barrier 22 components are substantially aligned parallel to the rows or columns of the pixels 43 of the image display 4 as shown in FIG. 31*a* or FIG. 31*b*. If lens 21 and parallax barrier 22 components are substantially aligned parallel the columns of pixels 43 of the image display 4, then an imaging function is performed on the pixels in a plane that is substantially perpendicular to the columns of pixels 43 and parallel to the rows of the pixels 43. For viewing multi-view images, such as 3D, a user's eyes must be substantially positioned within the plane that is substantially perpendicular to the columns of pixels 43 and substantially parallel to the rows of the pixels.

With reference to FIG. 31*b*, a switchable imaging optical device 1 comprised of lens 21 and parallax barrier 22 components is substantially aligned with columns of pixels 43 of an image display 4. The spatial extent of the optical element is indicated by the dashed line. The pixels 43 of the image display 4 have been ascribed an upper index of R, G or B to indicate the sub-pixel's colour (R=Red, G=Green, B=Blue) and have been ascribed a lower index of either L or R to indicate whether the sub-pixel is imaged to the Left eye or Right eye respectively. An image display 4 with a Landscape orientation (as shown in FIG. 25*b*) may have rows of pixels (as illustrated in FIG. 31*b*) that contain sub-pixels of the same colour and columns of sub-pixels (as illustrated in FIG. 31*b*) that contain a cyclic arrangement of coloured sub-pixels (red, green and blue for example). The arrangement of the switchable imaging optical device 1 with respect the pixels 43 as shown in FIG. 31*b* illustrates that all coloured sub-pixels are imaged to all angles in the viewing plane which is substantially perpendicular to columns and parallel to the rows. Consequently, with the user's eyes positioned in the plane for the observing multi-view images, the user will therefore see every colour of sub-pixel regardless of the viewing angle. Thus FIG. 31*b* enables a good quality multi-view display.

With reference to FIG. 31*a*, a switchable imaging optical device 1 comprised of lens 21 and parallax barrier 22 components is substantially aligned with columns of pixels 43 of an image display 4. The spatial extent of the optical element is indicated by the dashed line. The pixels 43 of the image display 4 have been ascribed an upper index of R, G or B to indicate a sub-pixel's colour (R=Red, G=Green, B=Blue) and have been ascribed a lower index of either L or R to indicate whether the sub-pixel is imaged to the Left eye or Right eye respectively. An image display 4 with a Portrait orientation (as shown in FIG. 25*a*) may have rows of pixels (as illustrated in FIG. 31*a*) that contain a cyclic arrangement of coloured sub-pixels (red, green and blue for example) and columns of sub-pixels of the same colour (as illustrated in FIG. 31*a*). The arrangement of the switchable imaging optical device 1 with respect the pixels 43 as shown in FIG. 31*a* illustrates that specific coloured sub-pixels are imaged to specific angles in the viewing plane which is substantially perpendicular to columns and parallel to the rows. Consequently, with the user's eyes positioned in the plane for the observing multi-view images, the user will therefore see sub-pixel colour of a specific colour at a specific viewing angle. The resulting multi-view display may therefore exhibit angular dependent colour artefacts and therefore may not enable a good quality multi-view display. In order to lessen the described colour artefact problem, the switchable imaging optical device 1 comprised of lens 21 and parallax barrier 22 components may be orientated at an oblique angle with respect to the rows and columns so that the lens 21 and parallax barrier 22 components are no longer substantially aligned parallel/perpendicular to the rows/columns.

Figure 31C:
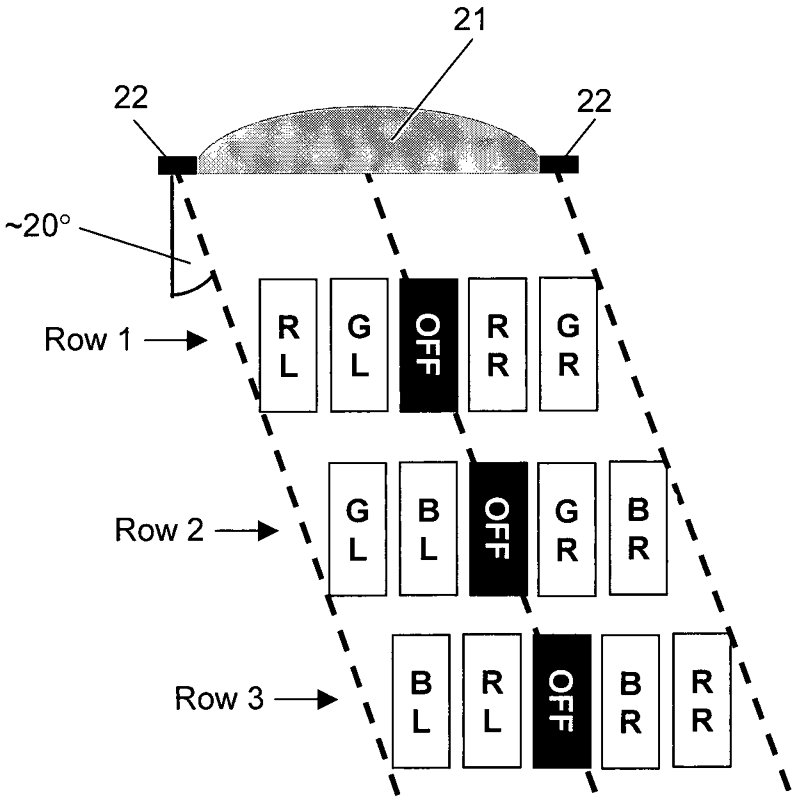
FIG. 31*c*: Multi-view display using oblique switchable imaging optical element and addressing of sub-pixels thereof.

With reference to FIG. 31*c*, a switchable imaging optical device 1 comprised of lens 21 and parallax barrier 22 components is aligned at an angle of approximately 20° (assuming a white pixel is square) with respect to the columns of pixels 43 of an image display 4. (By stating that a white pixel is "square", is meant that the sub-pixels making up a white pixel (eg, a red sub-pixel, a green sub-pixel and a blue sub-pixel for an RGB display) combine to give a white pixel that is a square.) The alignment angle is derived from the fact that ⅓ of a white pixel is traversed horizontally while a whole white pixel is traversed vertically by the lens array 21 and parallax barrier array 22. Consequently, the alignment angle of the lens 21 and parallax barrier 22 components is substantially $\tan^{-1}(1/3)$. The pitch of the switchable imaging optical device 1 substantially covers 5 sub-pixels. The arrangement of the switchable imaging optical device 1 with respect the pixels 43 as shown in FIG. 31*c* coupled with the image data (sub-pixel=Left eye image data OR sub-pixel=Right eye image data OR sub-pixel=OFF) addressed to the sub-pixels illustrates that with user's eyes positioned in the plane for observing multi-view images, the user will therefore see every colour of sub-pixel regardless of the viewing angle. Thus FIG. 31*c* lessens the aforementioned colour artefact problem and enables a good quality multi-view display.

Figure 31D:
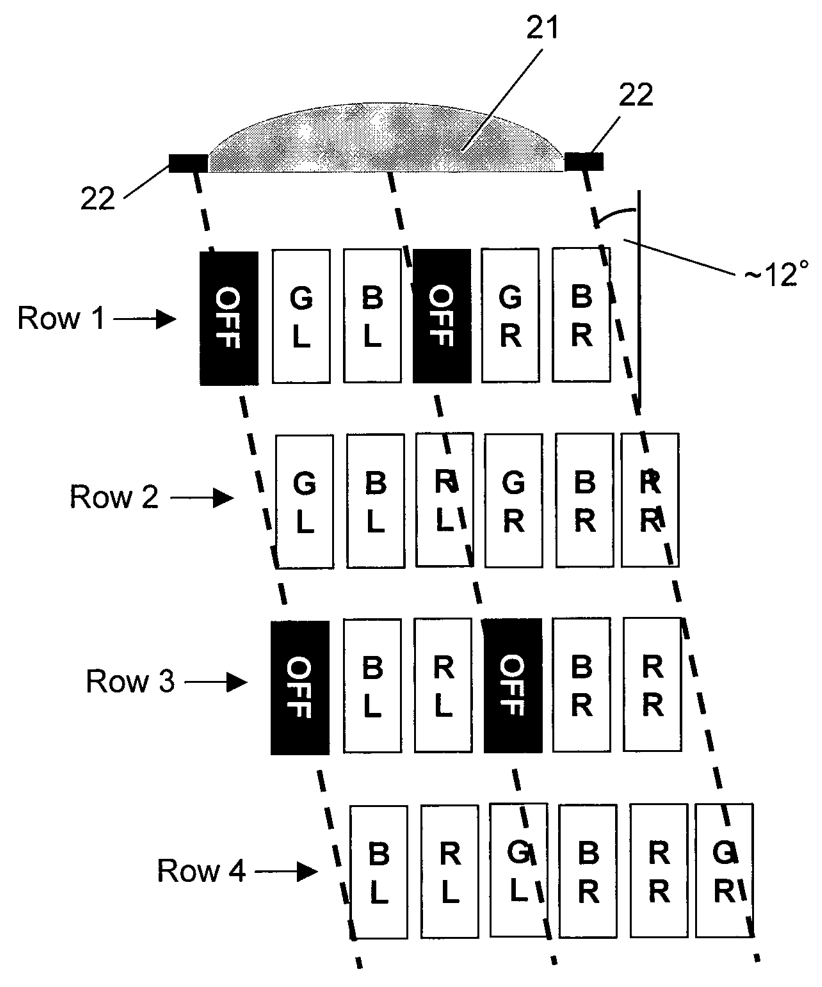
FIG. 31*d*: Multi-view display using oblique switchable imaging optical element and addressing of sub-pixels thereof.

With reference to FIG. 31*d*, a switchable imaging optical device 1 comprised of lens 21 and parallax barrier 22 components is aligned at an angle of approximately 12° (assuming a white pixel is square) with respect to the columns of pixels 43 of an image display 4. The alignment angle is derived from the fact that ⅔ of a white pixel is traversed horizontally while 3 white pixels is traversed vertically by the lens array 21 and parallax barrier array 22. Consequently, the alignment angle of the lens 21 and parallax barrier 22 components is substantially $\tan^{-1}(2/9)$. The pitch of the switchable imaging optical device 1 substantially covers 5 sub-pixels. The arrangement of the switchable imaging optical device 1 with respect the pixels 43 as shown in FIG. 31*d* coupled with the image data (sub-pixel=Left eye image data OR sub-pixel=Right eye image data OR sub-pixel=OFF) addressed to the sub-pixels illustrates that with user's eyes positioned in the plane for observing multi-view images, the user will therefore see every colour of sub-pixel regardless of the viewing angle. Thus FIG. 31*d* lessens the aforementioned colour artefact problem and enables a good quality multi-view display.

Figure 32A:
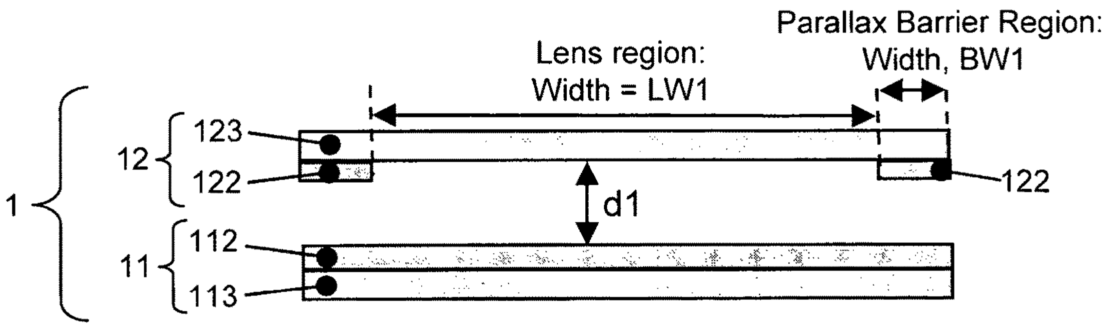
FIG. 32*a*: Side view of a switchable imaging.
Figure 32B:
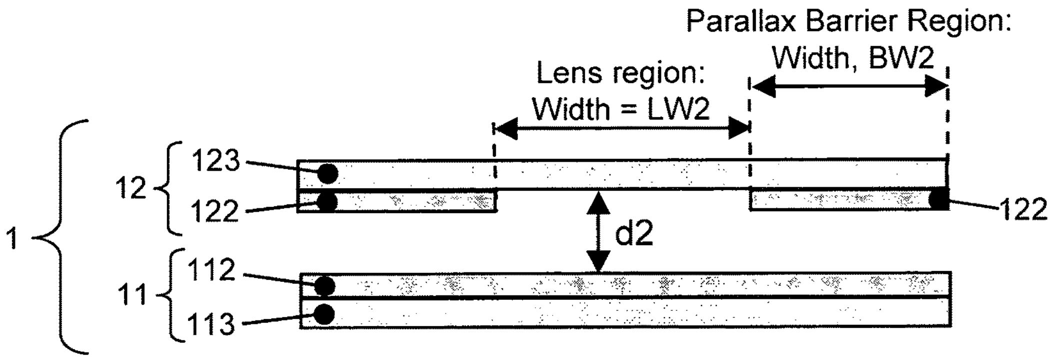
FIG. 32*b*: Side view of a switchable imaging.

With reference to FIG. 32*a* and FIG. 32*b*, a switchable imaging optical device 1 comprised of a first substrate 11 with unpatterned electrode 112 (alignment layer omitted for clarity) and second substrate 12 with patterned electrode 122 (alignment layer omitted for clarity) creates a lens region and a parallax barrier region. The width of the lens region is approximately commensurate with the gap between successive electrodes 122 and is located substantially between the electrodes 122. The width of the parallax barrier region is approximately commensurate with the width of the electrodes 122 and is located substantially under the electrodes 122. The lens region and parallax barrier region may be distinct or may overlap. With reference to FIG. 32*a* and FIG. 32*b*, controlling the width of the lens region (LW1 or LW2) and the width of the parallax barrier region (BW1 or BW2) is determined substantially by the predetermined width of the electrode 122. FIG. 32*a* illustrates a switchable imaging optical device 1 with a narrow width parallax barrier region relative to the width of the lens region (LW1>>BW1 or LW1>BW1). FIG. 32*b* illustrates a switchable imaging optical device 1 with a parallax barrier region and a lens region of commensurate width (LW2~BW2). For a given image display 4 and multi-view application, there are various advantages and disadvantages to the designs illustrated by FIG. 32*a* and FIG. 32*b*. An advantage of the design illustrated in FIG. 32*a* over FIG. 32*b* is that multi-view images, such as autostereoscopic 3D images, will be brighter since the lateral extent of parallax barrier in FIG. 32*a* is less than the lateral extent of parallax barrier in FIG. 32*b*. An advantage of the design illustrated in FIG. 32*b* over FIG. 32*a* is that the liquid crystal layer thickness d2 will be less than the liquid crystal layer thickness d1 (in general, the thickness of the liquid crystal layer 2, d can be derived to a first approximation from the formula $d=W^2/(8*f*\Delta n)$ where W is the lens width, f is the focal length of the lens in air and Δn is the birefringence of the liquid crystal material—the focal length of the lens is arranged to be approximately at the plane of the pixels of the image display). Consequently, the switchable imaging optical device 1 has great design flexibility since the proportion of parallax barrier 22 to GRIN lens 21 ratio can be varied and customised for any given application.

Figure 33A:
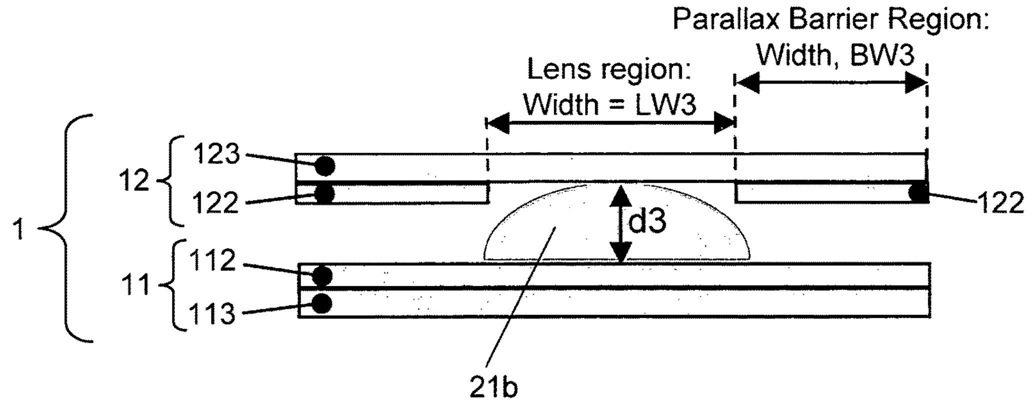
FIG. 33*a*: Side view of a switchable imaging.
Figure 33B:
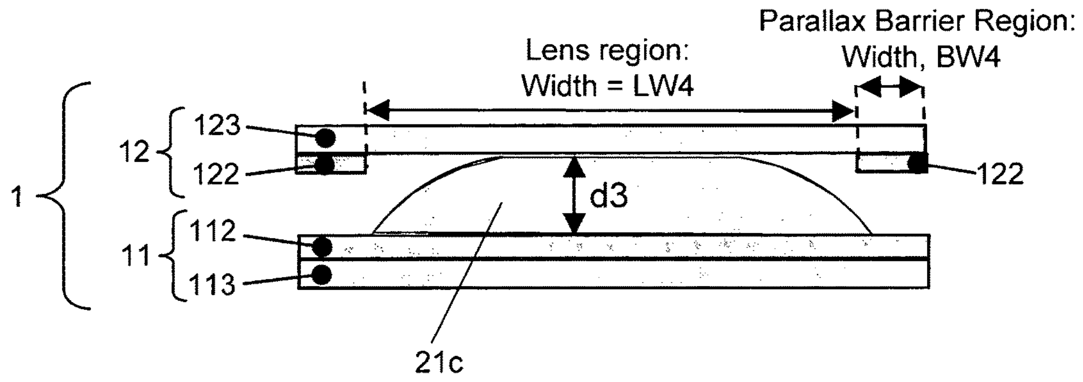
FIG. 33*b*: Side view of a switchable imaging.

With reference to FIG. 33*a* and FIG. 33*b*, a switchable imaging optical device 1 comprised of a first substrate 11 with unpatterned electrode 112 (alignment layer omitted for clarity) and second substrate 12 with patterned electrode 122 (alignment layer omitted for clarity) creates a lens region and a parallax barrier region. The width of the lens region is approximately commensurate with the gap between successive electrodes 122 and is located substantially between the electrodes 122. The width of the parallax barrier region is approximately commensurate with the width of the electrodes 122 and is located substantially under the electrodes 122. The lens region and parallax barrier region may be distinct or may overlap. With reference to FIG. 33*a* and FIG. 33*b*, controlling the width of the lens region (LW3 or LW4) and the width of the parallax barrier region (BW3 or BW4) is determined substantially by the predetermined width of the electrode 122. FIG. 33*b* illustrates a switchable imaging optical device 1 with a narrow width parallax barrier region relative to the width of the lens region (LW4>>BW4 or LW4>BW4). FIG. 33*a* illustrates a switchable imaging optical device 1 with a parallax barrier region and a lens region of commensurate width (LW3~BW3). When a voltage is applied between electrodes 122 and electrode 112, the LC molecules (not shown) in the region directly beneath the electrode 122 are reoriented to align with the electric field and define, in conjunction with polarising elements (not shown), the parallax barrier region. When a voltage is applied across electrodes 122 and electrode 112, the LC molecules in the region between the successive electrodes 122 (but not directly beneath the electrode 122) are reoriented by a fringing electric field and define the GRIN lens region. Re-orientation of the LC molecules in the lens region is most pronounced for LC molecules in close proximity to the electrode 122. The effect is also illustrated by LC modelling in FIG. 16. For a given LC layer thickness d3 and a lens region width LW3, the fringing electric field may re-orientate LC molecules at least to some extent from the edge of the lens region to the centre of the lens region. This re-orientation of the LC molecules is represented by the picture of a physical planar convex lens 21*b* in FIG. 33*a* representing the imaging function of the LC GRIN lens, since the LC lens imaging is approximated by the physical lens shape 21*b*. For a given LC layer thickness d3 and a lens region width LW4, the fringing electric field may re-orientate LC molecules in close proximity to the electrode 122 but not re-orientate LC molecules in the centre of the lens region. This re-orientation of the LC molecules is represented by the picture of the lens 21*c* in FIG. 33*a* since the LC lens imaging is approximated by the physical lens shape 21*c* shown in FIG. 33*a*. The lens shape 21*c* of FIG. 33*b* has a curved region in proximity to the electrode 122 and a non-curved region in the centre of the lens. The lens shape 21*c* of FIG. 33*b* may be transformed into the lens shape 21*b* by increasing the thickness of the LC layer d3 by an appropriate amount and/or by increasing the voltage between electrodes 122 and 112. For a given imaging application, it is usually desirable to minimise the LC layer thickness 2, d3. Consequently, the width of the electrode 122 may be chosen so as to achieve the desired imaging effect while the LC layer thickness 2, d3 is minimised. The LC lens may have an equivalent physical lens shape similar to 21*b* or 21*c* or somewhere in between 21*b* and 21*c*. Consequently, the switchable imaging optical device 1 has great design flexibility since the proportion of parallax barrier 22 to GRIN lens 21 ratio and the physical equivalent of the GRIN lens shape can be varied and customised for any given application.

With reference to FIG. 4*a* and FIG. 5*a*, the switchable imaging optical device 1 may be formed using a single patterned electrode 122 on one substrate that acts as a substrate of a liquid crystal cell. With reference to FIG. 21*a* and FIG. 22*a*, the switchable imaging optical device 1 may be formed using two patterned electrodes 1221*a*, 1221*b* on one substrate that acts as a substrate of a liquid crystal cell. With reference to FIG. 24*a*, the switchable imaging optical device 1 may be formed using a first pair of patterned electrodes 112*b*, 112*b* on a first substrate 11*b* that acts as a substrate of a liquid crystal cell, and a second pair of patterned electrodes 122*a*, 122*b* on a second substrate 12*b* that acts as a substrate of a liquid crystal cell. It will be appreciated to persons skilled in the art of liquid crystal lens technology that multiple, independently addressable electrodes can be employed on either a single substrate or both substrates that act(s) as a substrate of a liquid crystal cell in order to form a standard liquid crystal GRIN lens. Therefore it will be appreciated to persons skilled in the art of liquid crystal lens technology that multiple, independently addressable electrodes can be can be used to form a novel switchable imaging optical device 1 comprised of both lens 21 and parallax barrier 22 components.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

For example, in the embodiments described above it is intended that the entire active area of the device is switched. The invention is not however limited to this, and it is possible for different spatial areas of an imaging device of the invention to be switched independently of one other. The use of patterned electrodes, with direct addressing, passive addressing or active addressing are standard addressing schemes used in image displays so that different spatial areas of an image display can be switched independently of each other. The smallest independently addressable area of an image display 4 is a sub-pixel. Such addressing techniques may be applied to a switchable imaging device of the present invention, to allow a spatial area of the device to be switched independently of other spatial area(s) of the device. Thus, via the use of standard addressing schemes, such as patterned electrodes, passive addressing or active addressing, a switchable imaging optical device of the invention may be configured to have at least a first area that can be switched to an imaging mode and at least a second area that may be switched, independently of the first area, to a non-imaging mode. Consequently, a 2D-3D switchable display device can be realised where at least a first area of the device may yield a high quality 2D image while at least a second area of the device may yield a high quality 3D image. A switchable imaging optical device that has a twist angle of around 270° may be particularly suitable for area switching via a standard passive addressing scheme.

In the first mode of operation, the device may comprises a plurality of second regions and the polarising element may, in co-operation with the second regions, act to at least partially absorb light passing through each second region thereby defining a parallax barrier. This prevents optical cross-talk and, in combination with the lensing action, provides a good directional display mode.

In the first mode of operation, the or each first region may comprise a GRIN lens.

The second mode of operation may be a non-imaging mode, for example a 2-D display mode. In a non-imaging mode no lensing regions or parallax barrier regions are defined in the device.

In the first mode, the first region or at least one first region may overlap the second region or the at least one second region. Alternatively, in the first mode, the or each first region may not overlap the or each second region.

The device may be electrically switchable between the first mode and the second mode.

The electro-optic layer may comprise a liquid crystal material.

The or each second regions may act to at least partially attenuate light passing through the/each second region by arranging for light exiting a second region to have the plane of polarisation (or the major plane of polarisation) that is substantially not aligned with the transmission axis of the exit polariser. (The "major plane of polarisation refers to a case where light leaving the electro-optic layer is elliptically polarised rather than linearly polarised; in this case the light has both major and minor planes of polarisation, and it is the major plane of polarisation of light exiting a second region that should be substantially not aligned with the transmission axis of the exit polariser.)

Operation of the device requires that light incident on the electro-optic layer is substantially plane polarised and is preferably completely plane polarised. The plane polarised light incident on the electro-optic layer is arranged to be oriented substantially parallel, and preferably to be oriented completely parallel, to the liquid crystal alignment direction on the first substrate. To ensure this is the case, the device may comprise another polariser disposed in the path of light to the electro-optic layer, so that the electro-optic layer is disposed between the two polarisers which form an input polariser and an exit polariser (although provision of the input polariser may in principle be unnecessary if the device is illuminated with light that is substantially linearly polarised). The input polariser (if present) must be arranged to provide linearly polarised light to the electro-optic layer—however, the input polariser does not have to be a linear polariser, and may for example be a circular polariser. As an example, where the device is illuminated by light from an image display panel that is clad with circular polarisers, the light exiting the uppermost circular polariser (circular polariser adjoining the device) is linearly polarised. If necessary, a half-wave retarder may also be provided between the display and the electro-optic layer to rotate the linearly polarised light exiting the uppermost circular polariser to an appropriate angle for the correct operation of the device, i.e. parallel to the liquid crystal alignment direction on the first substrate. As a further example, where the device is illuminated by light from an image display panel that is clad with linear polarisers, a half-wave retarder may also be provided between the display and the electro-optic layer to rotate the linearly polarised light exiting the uppermost linear polariser to an appropriate angle for the correct operation of the device, i.e. parallel to the liquid crystal alignment direction on the first substrate.

The electro-optic layer may be disposed between a first electrode layer and a second electrode layer, the first electrode layer comprising a planar electrode layer and the second electrode layer comprising a plurality of second electrodes extending in a first direction and spaced apart in a second direction crossed with the first direction, wherein each second electrode substantially corresponds to a respective second region of the device.

The second electrode layer may further comprise a plurality of third electrodes extending in the first direction and spaced apart in the second direction, the second electrodes being interdigitated with the third electrodes.

The device may be in the second mode when no voltage is applied across the electro-optic layer by the first and second electrode layers.

Alternatively, the electro-optic layer may be disposed between a first electrode layer and a second electrode layer, the first electrode layer comprising a plurality of first electrodes extending in a first direction and spaced apart in a second direction crossed with the first direction, and the second electrode layer comprising a plurality of second electrodes extending in the second direction and spaced apart in the first direction. This provides a switchable imaging device that may additionally be operated in a third mode, which is another imaging mode (different from the first mode). For example the device may perform imaging along different directions in the first and third modes.

The first electrode layer may further comprise a plurality of third electrodes extending in the first direction, the third electrodes being interdigitated with the first electrodes.

The second electrode layer may further comprise a plurality of fourth electrodes extending in the second direction, the fourth electrodes being interdigitated with the second electrodes.

The electro-optic layer may be disposed between a first electrode layer and a second electrode layer, the second electrode layer comprising a plurality of second electrodes and third electrodes extending in the first direction and spaced apart in the second direction, the second electrodes being interdigitated with the third electrodes.

Alternatively, the electro-optic layer may be disposed between a first electrode layer and a second electrode layer, the first electrode layer comprising a plurality of first electrodes and fourth electrodes extending in a second direction and spaced apart in a first direction crossed with the second direction, the first electrodes being interdigitated with the fourth electrodes, and the second electrode layer comprising a plurality of second electrodes and third electrodes extending in the first direction and spaced apart in the second direction, the second electrodes being interdigitated with the third electrodes. This provides a switchable imaging device that may additionally be operated in a third mode, which is another imaging mode (different from the first mode). For example the device may perform imaging along different directions in the first and third modes.

The liquid crystal layer may have a twist alignment when the device is in the second mode. In one advantageous embodiment, the exit polariser is oriented with its transmission axis at $\phi°$ to the plane of polarisation of linearly polarised light incident on the electro-optic layer (for example at $\phi°$ to the transmission axis of an input linear polariser if one is present). If the liquid crystal layer has a twist alignment in which the twist angle across the liquid crystal layer is $\phi°$ so that, when the device is in the second mode, the liquid crystal layer rotates the plane of polarisation of linearly polarised light by approximately an angle $\phi°$ the rotation of the plane of polarisation as the light passes through the liquid crystal layer will mean that the plane of polarisation of the light exiting the liquid crystal layer is aligned with the transmission axis of the exit polariser—so that the device is maximally transmissive over its entire area, giving a non-imaging mode. The effect of switching the device to an imaging mode is that light passing through a second region of the liquid crystal layer no longer has its plane of polarisation rotated by $\phi°$ as the light passes through the liquid crystal layer, so that the plane of polarisation (or the major plane of polarisation) of the light exiting a second region of the liquid crystal layer is not substantially aligned with the transmission axis of the exit polariser and a light-attenuating region is defined.

Preferably the device is arranged such that, when it is in the second mode the plane of polarisation (or the major plane of polarisation) of light exiting the liquid crystal layer is aligned with the transmission axis of the exit polariser so that the device is maximally transmissive over its entire area, and such that in an imaging mode light exiting a second region of the liquid crystal layer has its plane of polarisation (or the major plane of polarisation) substantially orthogonal to the transmission axis of the exit polariser—so that the device is maximally light-attenuating in the second region of the liquid crystal layer in the imaging mode. As one way to achieve this, the twist alignment of the liquid crystal layer may have a twist angle of approximately 90° (or $90°+n\times180°$, where n=0, 1, 2 etc). If n>0, then a chiral dopant must be used to achieve the desired twist angle. If the twist state of the liquid crystal layer rotates the plane of polarisation of linearly polarised light by an angle 90° (or $90°+n\times180°$) as the light passes through the liquid crystal layer and the exit polariser is oriented with its transmission axis at 90° to the plane of polarisation of linearly polarised light incident on the electro-optic layer then, if the effect of switching the device to the first mode is that the liquid crystal in the/a second region of the liquid crystal layer is switched to a state in which it does not significantly rotate the plane of polarisation (or the major plane of polarisation) of light, this means that the plane of polarisation (or the major plane of polarisation) of light exiting the liquid crystal layer is substantially orthogonal to the transmission axis of the exit polariser and a light-attenuating action is realised.

Moreover, the input polariser (if present) may be arranged to illuminate the device with linearly polarised light that has a plane of polarisation aligned substantially parallel to the rubbing direction on the lowermost substrate of the device.

Moreover, the exit polariser may be arranged such that the transmission axis is aligned substantially parallel to the rubbing direction on the uppermost substrate of the device.

The liquid crystal layer may have a substantially vertically-aligned state in the bulk of the liquid crystal layer away from the surfaces of the liquid crystal layer and situated under each second electrode, while the twist state is compressed to the centre of the liquid crystal layer in the second regions when the device is in the first mode.

The device may have a first electrode 112 and an array of second electrodes 122, the liquid crystal layer being disposed between the first electrode and the second electrodes, a second electrode defining, upon application of a non-zero voltage across the liquid crystal layer, an edge of a first GRIN lens and an edge of a second GRIN lens. This is illustrated in, for example, FIG. 16, which shows an electrode defining the right edge of a first GRIN lens and the left edge of a second GRIN lens. (Preferably the array of second electrodes is wider than the active area of the display, so that any edge effects occurring at the edges of the array of second electrodes are outside the active area of the display and so do not affect the optical quality of the display.)

The second LC alignment may be a substantially vertical LC alignment state in the bulk of the liquid crystal layer away from the surfaces of the liquid crystal layer and situated under each second electrode, while the twist state is compressed to the centre of the liquid crystal layer in the second regions when the device is in the first mode.

The liquid crystal layer may be disposed between first and second alignment layers, the alignment direction of the first alignment layer being crossed with the alignment direction of the second alignment layer thereby to define twisted liquid crystal alignment in the absence of an applied voltage across the liquid crystal layer.

The twisted liquid crystal alignment may be a substantially 90° twist alignment.

The device may have a first electrode and an array of second electrodes, the liquid crystal layer being disposed between the first electrode and the second electrodes, each second electrode defining a respective second region of the liquid crystal layer. Moreover, each second electrode also defines, at least partially, a respective first region of the liquid crystal layer. For example, in the embodiment of FIG. 16 the second electrodes 122 are responsible for forming the parallax barrier and the lens array. The region of the liquid crystal layer under one of the second electrodes 122 form an non-transmissive (or low-transmissive) region of the parallax barrier, but the fringing fields from two neighbouring second electrodes 122 form the GRIN lens between the two second electrodes 122.

A device of the first or second aspect may comprise a plurality of independently addressable areas, each area being switchable between the first mode of operation and the second mode of operation independent of the other area(s). This allows, for example, at least a first area of the device to yield a high quality 2D image (by being switched to a non-imaging mode) at the same time as at least a second area of the device yields a high quality 3D image (by being switched to an imaging mode).

INDUSTRIAL APPLICABILITY

A 2D-3D switchable display system suitable for mobile phones, handheld games consoles, portable PCs, photo-frames and multi-view television.

The invention claimed is:

1. A switchable imaging optical device, the device having a first mode of operation in which the device performs an imaging function for redirecting incident polarised light and a second mode of operation in which the device performs a non-imaging function that does not redirect said incident polarised light, wherein the device comprises;

a polarised light source having a transmission axis arranged in a first direction;

a first substrate upon which is a first electrode layer and a first liquid crystal alignment layer with the first liquid crystal alignment layer arranged to align a liquid crystal material in said first direction;

a liquid crystal layer;

a second substrate upon which is a second electrode layer and a second liquid crystal alignment layer with the second liquid crystal alignment layer arranged to align a liquid crystal material in a second direction; and a polariser with the transmission axis arranged in said second direction, wherein said first direction is different from said second direction;

wherein in the first mode of operation the liquid crystal layer comprises at least one first region that performs a lensing action and at least one second region; and wherein the polarised light source and polariser act in co-operation with the second region(s) to at least partially absorb light passing through the or each second region thereby defining a parallax barrier.

2. A device as claimed in claim 1 wherein the first mode of operation enables viewing of autostereoscopic 3D images and the second mode of operation enables viewing of 2D images.

3. A device as claimed in claim 1 wherein, in the first mode of operation, the or each first region comprises a GRIN lens.

4. A device as claimed in claim 1 wherein the second mode of operation is a non-imaging mode.

5. A device as claimed in claim 1, wherein, in the first mode, the first region or at least one first region partially overlaps the second region or the at least one second region.

6. A device as claimed in claim 1, wherein, in the first mode, the or each first region does not overlap the or each second region.

7. A device as claimed in claim 1, the device being electrically switchable between the first mode and the second mode.

8. A device as claimed in claim 1 wherein the liquid crystal layer is disposed between a first electrode layer and a second electrode layer, the first electrode layer comprising a planar electrode layer and the second electrode layer comprising a plurality of second electrodes extending in a first direction and spaced apart in a second direction crossed with the first direction, wherein each second electrode corresponds to a respective second region of the device.

9. A device as claimed in claim 8 wherein the second electrode layer further comprises a plurality of third electrodes extending in the first direction and spaced apart in the second direction, the second electrodes being interdigitated with the third electrodes.

10. A device as claimed in claim 8 wherein the device is in the second mode when no voltage is applied across the liquid crystal layer by the first and second electrode layers.

11. A device as claimed in claim 1 wherein the liquid crystal layer is disposed between a first electrode layer and a second electrode layer, the first electrode layer comprising a plurality of first electrodes extending in a first direction and spaced apart in a second direction crossed with the first direction, and the second electrode layer comprising a plurality of second electrodes extending in the second direction and spaced apart the first direction.

12. A device as claimed in claim 11, wherein the first electrode layer further comprising a plurality of third electrodes extending in the first direction, the third electrodes being interdigitated with the first electrodes.

13. A device as claimed in claim 11, wherein the second electrode layer further comprising a plurality of fourth electrodes extending in the second direction, the fourth electrodes being interdigitated with the second electrodes.

14. A device as claimed in claim 1 wherein the liquid crystal layer has a twist alignment when the device is in the second mode.

15. A device as claimed in claim 14 wherein the twist alignment of the liquid crystal layer has a twist angle of approximately 90°.

16. A device as claimed in claim 14 wherein the liquid crystal layer has substantially vertically-aligned state in the second regions in the first mode.

17. A device as claimed in claim 1 and comprising a plurality of independently addressable areas, each area being switchable between the first mode of operation and the second mode of operation independent of the other area(s).

18. A display comprising an image display panel and a switchable imaging optical device as defined in claim 1 disposed in path of light after passing through the image display panel.

* * * * *